United States Patent
Shiino et al.

(10) Patent No.: US 7,982,347 B2
(45) Date of Patent: Jul. 19, 2011

(54) MOTOR CONTROL APPARATUS, POWER STEERING APPARATUS AND BRAKE CONTROL APPARATUS

(75) Inventors: Kohtaro Shiino, Kanagawa (JP); Makoto Kimura, Yokohama (JP); Toshiro Yoda, Saitama (JP); Haruhiko Fujita, Tokyo (JP); Yoshimori Kondo, Kanagawa (JP); Yoshiki Sakamoto, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/692,890

(22) Filed: Jan. 25, 2010

(65) Prior Publication Data

US 2010/0126794 A1 May 27, 2010

Related U.S. Application Data

(63) Continuation of application No. 11/281,596, filed on Nov. 18, 2005, now Pat. No. 7,663,273.

(30) Foreign Application Priority Data

Nov. 22, 2004 (JP) ................................. 2004-336806
Sep. 8, 2005 (JP) ................................. 2005-260111

(51) Int. Cl.
H02K 11/00 (2006.01)
(52) U.S. Cl. ........................................ 310/68 B; 310/90
(58) Field of Classification Search .............. 310/68 B, 310/68 R, 83, 89, 75 R
See application file for complete search history.

(56) References Cited

U.S. PATENT DOCUMENTS

| | | | |
|---|---|---|---|
| 6,072,254 A | 6/2000 | Heib et al. | |
| 6,201,326 B1 * | 3/2001 | Klappenbach et al. | 310/75 R |
| 6,491,131 B1 | 12/2002 | Appleyard | |
| 6,707,188 B2 * | 3/2004 | Torii et al. | 310/75 R |
| 6,756,711 B2 | 6/2004 | Matsuyama et al. | |
| 6,906,483 B2 | 6/2005 | Tominaga et al. | |
| 7,095,146 B2 | 8/2006 | Fukazawa et al. | |
| 2002/0109426 A1 | 8/2002 | Peter et al. | |
| 2006/0108884 A1 | 5/2006 | Shiino et al. | |
| 2006/0113852 A1 * | 6/2006 | Adachi et al. | 310/71 |

FOREIGN PATENT DOCUMENTS

JP 2003-173920 6/2003

* cited by examiner

*Primary Examiner* — Nguyen N Hanh
(74) *Attorney, Agent, or Firm* — Antonelli, Terry, Stout & Kraus, LLP.

(57) ABSTRACT

An electric power steering apparatus including: a power system board which is received in a housing, which supports a component of a power supply circuit to supply power to a motor; a control system board which is received in the housing, which supports a component of a control circuit to control the motor, and which extends radially with respect to an axis of the motor output shaft; a rotation sensor which is provided in the housing, which is located, in an axial direction of a motor output shaft, between the motor and the control system board, and which is arranged to sense a rotational position of the motor output shaft; and an output terminal which is provided with the rotation sensor, which is connected electrically with the control system board to supply a rotational position signal of the rotation sensor to the control circuit.

6 Claims, 21 Drawing Sheets

MOTOR CONTROL APPARATUS, POWER STEERING APPARATUS AND BRAKE CONTROL APPARATUS

CROSS REFERENCE TO RELATED APPLICATION

This is a continuation of U.S. application Ser. No. 11/281,596, filed Nov. 18, 2005 now U.S. Pat. No. 7,663,273. This application relates to and claims priority from Japanese Patent Application No. 2005-260111, filed on Sep. 8, 2005 and No. 2004-336806, filed on Nov. 22, 2004. The entirety of the contents and subject matter of all of the above is incorporated herein by reference.

BACKGROUND OF THE INVENTION

The present invention relates to motor control apparatus which can be used for a vehicle power steering system, a vehicle brake system etc.

A United States Patent Application Publication US 2003/0173920 ($\approx$U.S. Pat. No. 6,906,483B2$\approx$JP2003-3267233A) shows electric power steering apparatus including a motor and a motor control system board enclosed in a board housing.

SUMMARY OF THE INVENTION

However, the board housing of the electric power steering apparatus of this US publication is so provided as to increase the entire size of the apparatus.

It is an object of the present invention to provide motor control apparatus which is simplified in construction and compact.

According to one aspect of the present invention, a motor control apparatus comprises: a motor including a rotating member; and a control system board supporting a component of a control circuit to control the motor, and including a first board portion facing in a direction along a rotation axis of the motor, and a second board portion extending radially from the first board portion.

According to another aspect of the invention, the motor control apparatus further comprises an actuating section connected with the motor to receive torque from the motor. The control apparatus may be a power steering system or a brake control system.

DETAILED DESCRIPTION OF THE INVENTION

Figure 1:
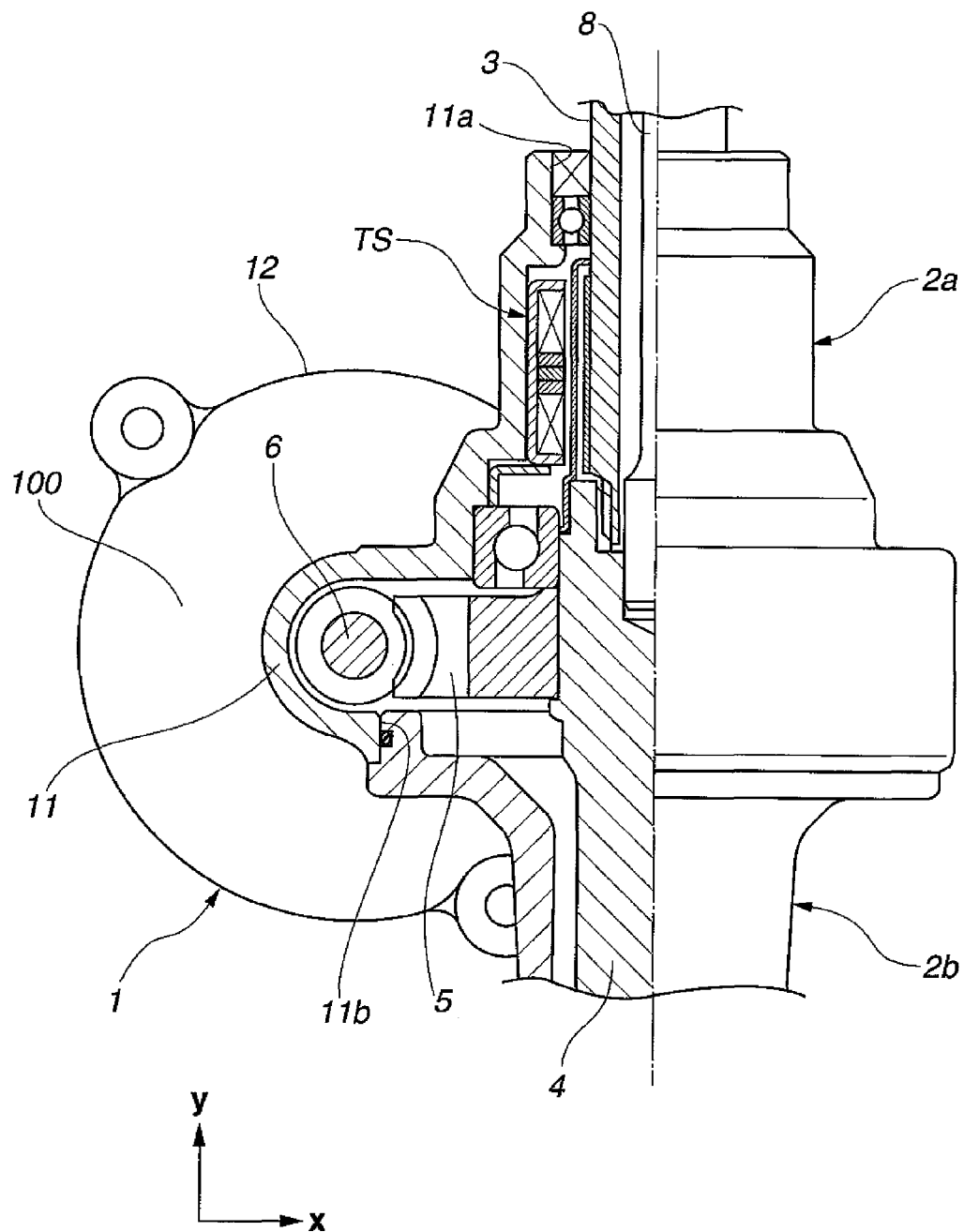
FIG. 1 is a partial sectional view as if cut by a x-y plane, of a motor control apparatus in the form of an electric power steering system according to a first embodiment of the present invention.

FIGS. 1~6 show a motor control apparatus or system according to a first embodiment of the present invention. The motor control apparatus includes at least a motor control section 1. In the first embodiment, the motor control apparatus further includes an actuating section which is combined with motor control section 1, to form an electric power steering system. In these figures, a y axis is parallel to the axial direction of the power steering system; an x axis is perpendicular to the y axis and parallel to the sheet of FIG. 1; and a z axis is perpendicular to the sheet of FIG. 1.

Motor control section 1 of this embodiment includes at least a motor 100, a power system board or substrate 400 for supporting components of a power supply circuit, and a control system board or substrate 300 for supporting components of a control circuit. Motor 100 includes a stator 110 and a rotating member 120 including a rotor. The power supply circuit includes one or more semiconductor switching devices 410 which are mounted on the power system board 400, and which are configured to supply power to motor 100. In this example, each switching device includes an inverters 410. In this example, the control circuit includes a microcomputer for controlling the inverters 410, and the microcomputer is mounted on control system board 300.

Control system board 300 includes at least a first board portion or motor side portion 301, and a second board portion or outer portion 302. First board portion 301 is provided at one end of motor 100, on the z axis positive side of motor 100 that is the upper side of motor 100 as viewed in FIG. 3. First board portion 301 is oriented so that the axis of rotor 120 is perpendicular to first board portion 301. Second board portion 302 extends radially outward from first board portion 301. In this example, control system board 300 is a substantially flat single board, and the first and second board portions 301 and 302 are both substantially flat and substantially even (in the same plane).

Power steering system of this embodiment includes at least the above-mentioned motor control section 1, an assembly housing including a first housing 2a and a second housing 2b, a steering input shaft 3, a pinion shaft 4, a worm wheel 5, a worm shaft 6 (serving as a driven member driven by motor 100), a torque sensor TS, and a rotational position sensor 130. Control system board 300 is disposed so that worm shaft 6 is perpendicular to control system board 300. Control system board 300 is connected with torque sensor TS, power system board 400 and rotational position sensor 130 which is arranged to sense the rotation of motor 200.

Figure 5:
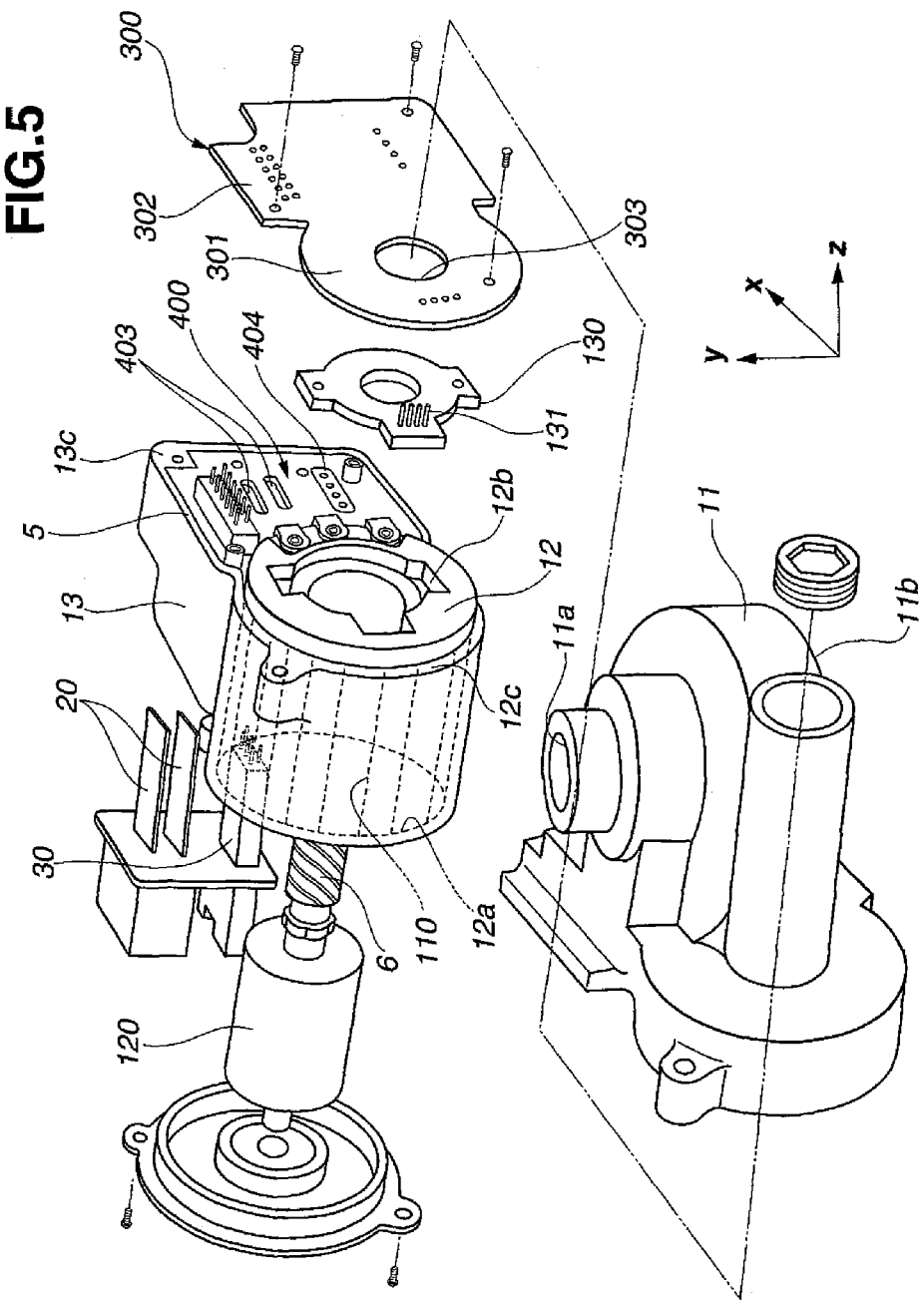
FIG. 5 is an exploded perspective view of the power steering system of FIG. 1.

First housing 2a includes at least a gear housing 11, a motor housing 12, and a power system board housing 13 (as best shown in FIG. 5). In the illustrated example, motor housing 12 and power system board housing 13 are integral with each other, and integral parts of a single housing. Motor housing 12 is provided on the z axis negative side of gear housing 11 (that is the lower side of gear housing 11 as viewed in FIG. 3). Power system board housing 13 is located on the z axis negative side of gear housing 11, and on the x axis positive side of motor housing 12 (that is the right side of motor housing 12 as viewed in FIG. 3).

Gear housing 11 includes a main portion shaped like a cup having a bottom. The bottom of gear housing 11 faces in the y axis positive direction (that is the upward direction as viewed in FIG. 1), and is formed with a through hole 11a through which the steering input shaft 3 is inserted. Gear housing 11 includes an opening 11b on the y axis negative side (that is the lower side as viewed in FIG. 1). Pinion shaft 4, worm wheel 5, control system board 300 and torque sensor TS are inserted sequentially through the opening 11b of gear housing 11.

Steering input shaft 3 is a hollow cylindrical shaft (extending in the y axis direction), and has therein a torsion bar 8. Input shaft 3 is adapted to be connected with a steering wheel of a vehicle. Input shaft 3 is connected through torsion bar 8 with pinion shaft 4. In the gear housing 11, torque sensor TS is disposed around input shaft 3, and arranged to sense the relative rotation between input shaft 3 and pinion shaft 4 due to a steering operation of a driver of a vehicle, and to send a signal to control system board 300.

Figure 3:
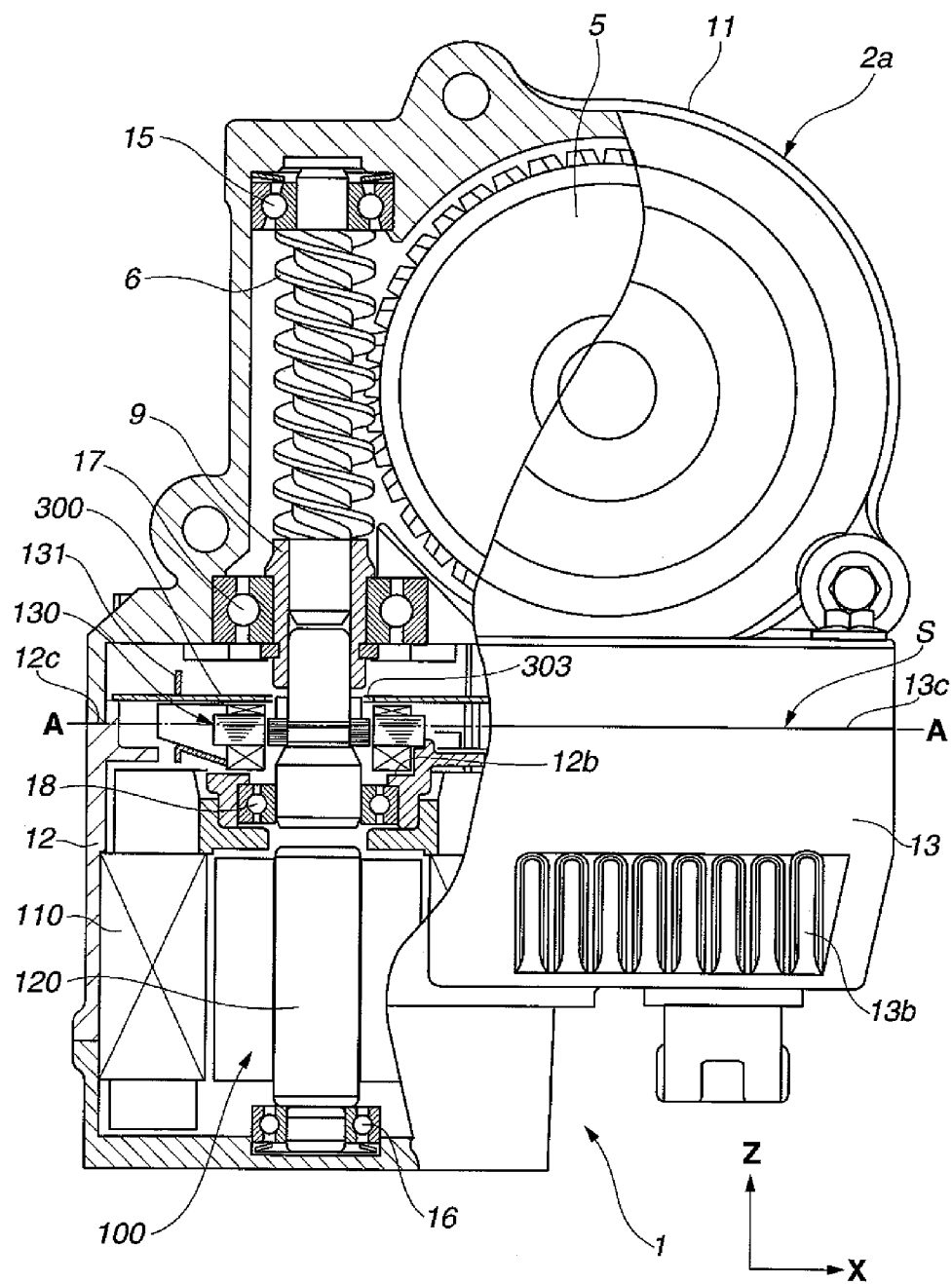
FIG. 3 is a partial section view as if cut by a x-z plane, of the power steering system of FIG. 1.
Figure 4:
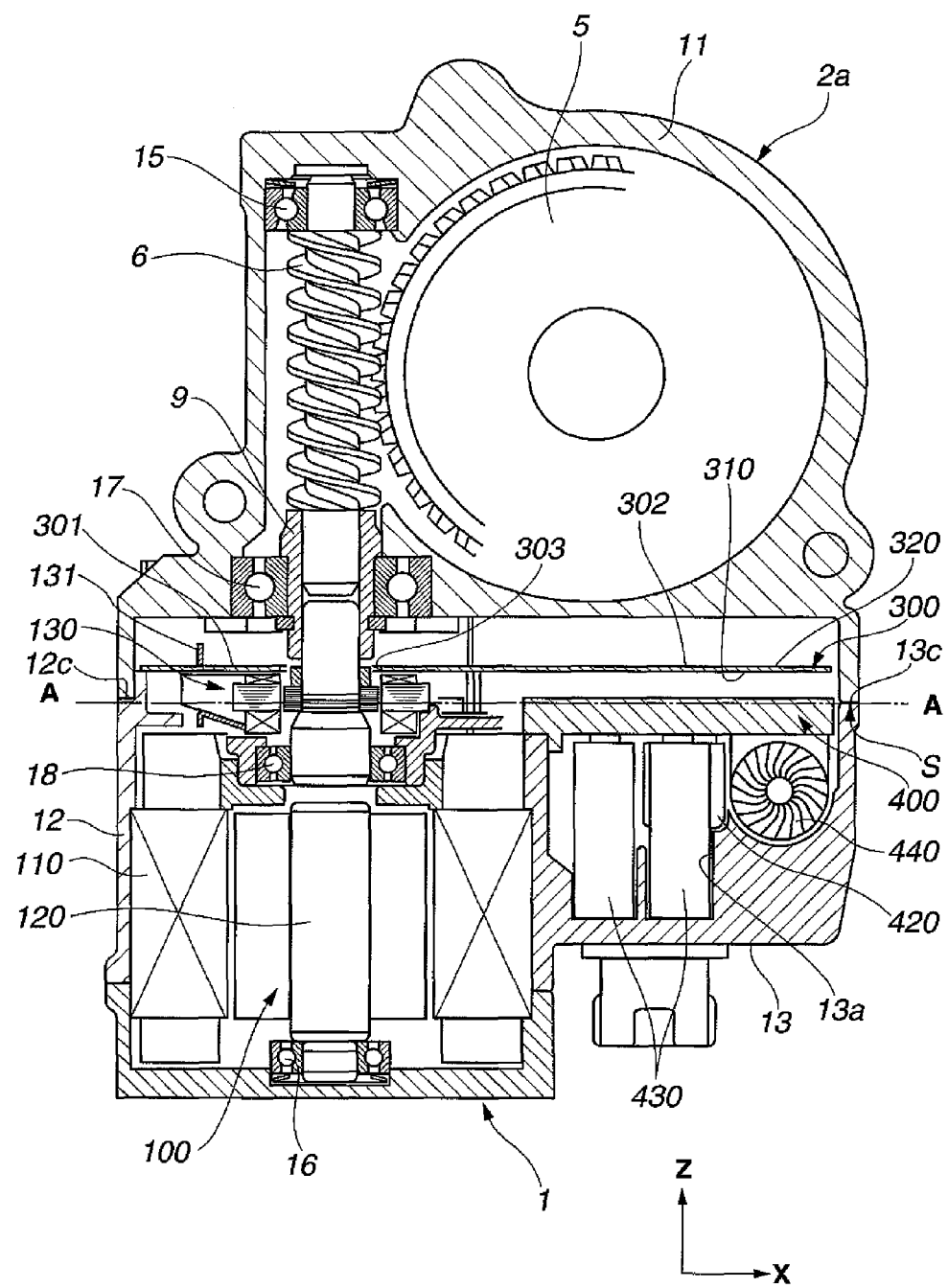
FIG. 4 is a full sectional view, as if cut by a x-z plane, of the power steering system of FIG. 1.

Motor housing 12 encloses motor 100 as shown in FIGS. 3, 4 and 5, and extends in the positive direction of the z axis from a first end formed with a motor insertion opening 12a which is opened in the z-axis negative direction and which is so sized that motor 100 can be inserted therethrough, to a second end defined by an annular end wall formed with a sensor mounting portion 12b which is opened in the z-axis positive direction as best shown in FIG. 5 and which is so shaped that the rotational position sensor 130 can be mounted from the z axis positive direction (from above as viewed in FIG. 3). Motor housing 12 further includes a circumferential wall surrounding stator 110 and rotor 120.

Rotational position sensor 130 is located adjacent to control system board 300 on the z axis positive side of motor housing 12, and interposed between the motor housing 12 on the z axis negative side and the control system board 300 on the z axis positive side (the upper side as viewed in FIG. 3). Control system board 300 is disposed so that the axis of rotor 120 (output shaft of motor 100) is perpendicular to control system board 300. Rotational position sensor 130 is connected, by output terminals 131, with control system board 300. In this example, output terminals 131 are in the form of connecting pins which project perpendicularly from rotational position sensor 130 in the z axis positive direction, and which are inserted in respective pin holes formed in control system board 300 as shown in FIG. 5. Since rotational position sensor 130 is adjacent to control system board 300, output terminals 131 can be made shorter.

Motor 100 of this example is a brushless motor including stator 110 and rotor 120. Current is supplied to stator 110 in accordance with the rotational position of rotor 120 sensed by rotational position sensor 130. Rotational position sensor 130 is fixed to the sensor mounting portion 12b formed in the second end of motor housing member 12, at the position confronting the axial end of rotor 120 on the z axis positive side. Rotational position sensor 130 is enclosed in first housing member 2a so that the connection through output terminals 131 between rotational position sensor 130 and control system board 300 is made easier and more reliable. Motor 100 is not limited to the brushless type. Motor 100 may be a brush motor.

Figure 2:
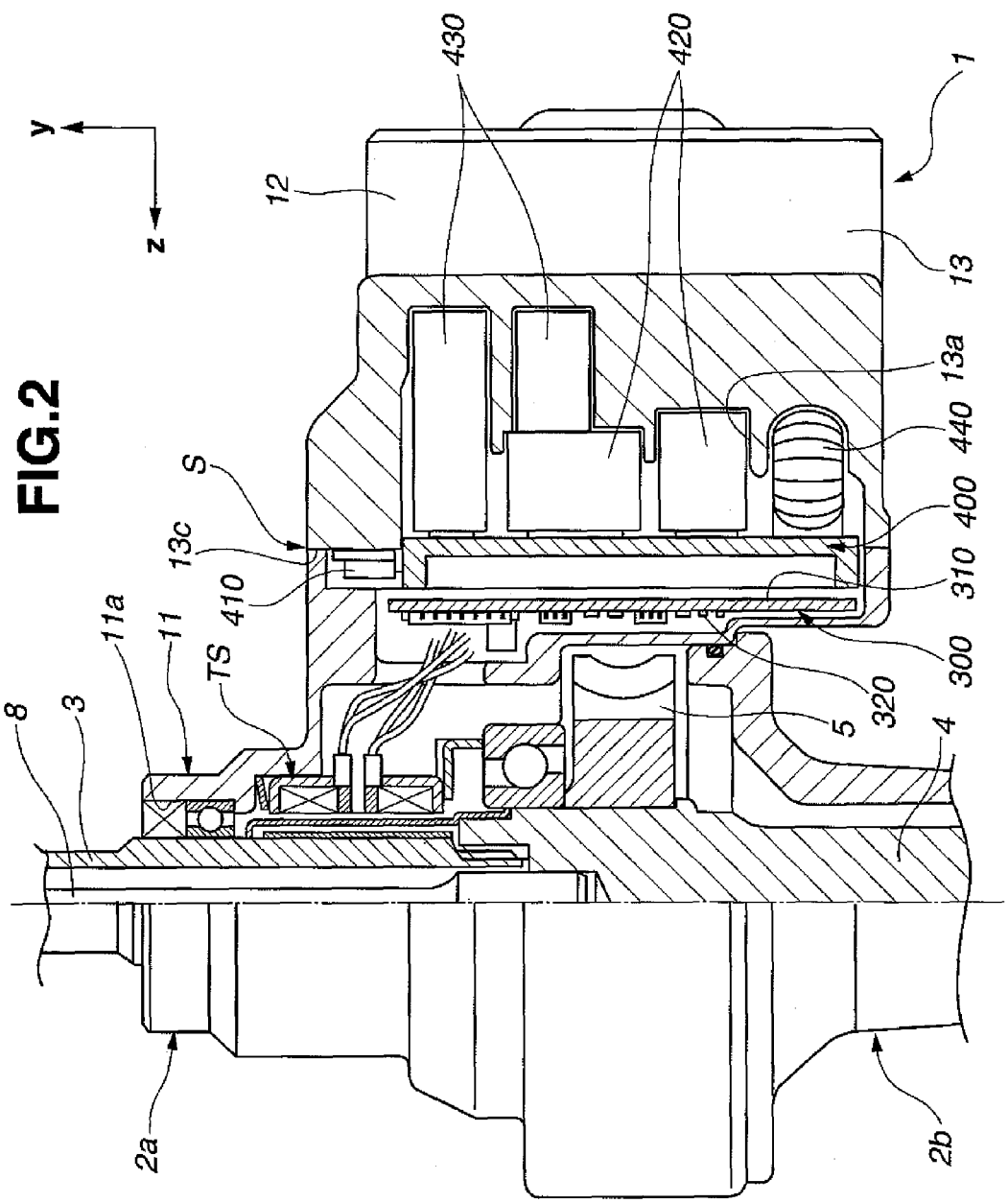
FIG. 2 is a partial sectional view as if cut by a y-z plane, of the power steering system of FIG. 1.

Power system board housing 13 is made of a heat conductive material which, in this example, is an aluminum alloy. In this example, power system board housing 13 is formed by aluminum die casting in order to obtain better cooling effect or improve the ability of heat dissipation. Power system board 400 is enclosed in power system board housing 13. As shown in FIG. 2, power system board housing 13 includes a plurality of power system device receiving portions 13a enclosing and fitting over the power system devices 420, 430 and 440, independently at respective positions. These power system devices are devices mounted on power system board 400. Each of the power system device receiving portions 13a is a socket like portion recessed in the z-axis negative direction (that is the upward direction as viewed in FIG. 2).

A heat sink 13b is provided, as shown in FIG. 3, on the z-axis negative side of power system board housing 13, at the outer circumference of the power system device receiving portions 13a. Heat sink 13b is designed to absorb and dissipate heat of inverters 410 disposed in the power system board housing 13, by increasing the surface area.

The integral housing member composed of motor housing 12 and power system board housing 13 includes an end 12c, 13c facing toward the control system board 300 on the z axis positive side. The end 12c, 13c has a joint surface S to which the gear housing member 11 enclosing the control system board 300 is joined. This joint surface S is substantially flat and even in the same flat plane, that is an A-A plane as shown in FIG. 3.

At the time of assembly, the power system devices 420~440 are fit in the respective receiving (receptacle or socket) portions 13a of power system board housing 13. The receiving portions 13a are designed to individually position the devices 420~440 simply by insertion of the devices in the respective receiving portions 13a. Accordingly, by covering the power system board 400 on the power system board housing member 13 having the power system devices fit in the respective receptacle portions 13a, the power system devices can be readily set at the correct positions in the power system board 400, so that soldering operation for the power system devices becomes easier.

Second housing 2b covers pinion shaft 4 from the y-axis negative side, and closes the opening 11b of first housing 2a, as shown in FIG. 1.

Control system board 300 is disposed between power system board 400 and worm wheel 5, as shown in FIG. 4, and accordingly between motor 100 and worm wheel 5. Control system board 300 in the form of a flat plate is parallel to the x-y plane and perpendicular to the worm shaft 6. Control system board 300 (or the circuit of control system board 300) drives motor 100 by outputting a drive command signal to power system board 400 (or the circuit of power system board 400) in accordance with a steering torque sensed by torque sensor TS.

Control system board 300 is disposed on the z axis positive side of motor 110, that is, on the side on which rotational position sensor 130 is located. Output terminals 131 of this sensor 130 in this example extend substantially straight in the z axis positive direction along the axis of motor 100, so that the longitudinal direction of output terminals 131 is substantially perpendicular to the control system board 300. Output terminals 131 is connected with control system board 300 substantially at right angles.

Control system board 300 has a motor side surface facing the motor housing member 12 in the z-axis negative direction, and an outer side surface facing the gear housing 11 in the z axis positive direction. Control system devices are mounted on both sides of the control system board 300, and the circuit formed on control system board 300 is composed of a motor side circuit 310 formed on the motor side surface and an outer side circuit 320 formed on the outer side surface of control system board 300, as shown in FIG. 2 etc. Thus, both sides of control system board 300 are used for installation of devices, so that the area for mounting various devices is increased. The motor side circuit 310 and outer side circuit 320 are united by control system board 300 into a single circuit board facilitating the assembly and handling operations.

Control system board 300 includes the first board portion (motor side portion) 301 and the second board portion (outer portion) 302, as mentioned before. The first board portion 301 is formed with a through hole 303 in which the rotating member 120 of motor 100 is inserted. Second board portion 302 extends radially from first board portion 302. In the illustrated example, the rotating member 120 of motor 100 includes the rotor and the motor output shaft which is integral with the rotor. The motor output shaft is inserted through the through hole 303.

Power system board 400 is disposed, in first housing 2a, at a position adjacent to control system board 300, and connected electrically with control system board 300 by harness and connectors. Power system board 400 and control system board 300 are close to each other, so that the length of the electrical connection between both boards can be reduced.

In the example shown in FIG. 5, the power supply circuit of power system board 400 and the control circuit of control system board 300 are electrically connected by connecting pins each of which includes a first pin end supported by power system board 400 and a second pin end supported by the second board portion 302 of control system board 300, or inserted in a corresponding pin hole formed in control system board 300.

Power system board 400 extends radially with respect to the axis of motor 100, on the x axis positive side of motor 100, as shown in FIG. 5. Power system board 400 overlaps the second board portion or outer portion 302 of control system board 300. Power system board 400 confronts the second board portion 302 of control system board 300 along the z axis. Power system board 400 and control system board 300 extend substantially in parallel to each other side by side. Accordingly, the connection between both boards is easier.

Power system board 400 includes through portions 403 and 404 (as shown in FIG. 5) for receiving a power supply connector 20 and a signal connector 30 extending in the z-axis positive direction through the power board housing 13 and through power system board 400, toward control system board 300. Power supply connector 20 is a device for supply electric power from the outside. In this example, power is supplied to power system board 400, and further supplied to control system board 300 via power system board 400. Signal connector 30 is for supplying one or more signals representing vehicle operating conditions to control system board 300. These connectors extend straight through housing 13 and power system board 400 toward control system board 300 and these connectors can reach the control system board 300. Therefore, it is easy to deliver a vehicle speed signal and other vehicle operating condition signals to the circuit on control system board 300, from the outside. In this example, the power system board housing 13 also includes through portions for receiving the power supply connector 20 and the signal connector 30.

The power system device group mounted on power system board 40 includes at least relay 420, capacitor 430, and noise removing coil 440, as shown in FIG. 2. On the x axis positive side, there is formed a dead space by a radial outer side of motor 100 (on the x axis positive side) and the x axis positive side portion of control system board 300. Therefore, the relatively large relay 420, capacitor 430 and noise removing coil 440 are installed in this dead space so as to reduce the size of the entire system.

Figure 6:
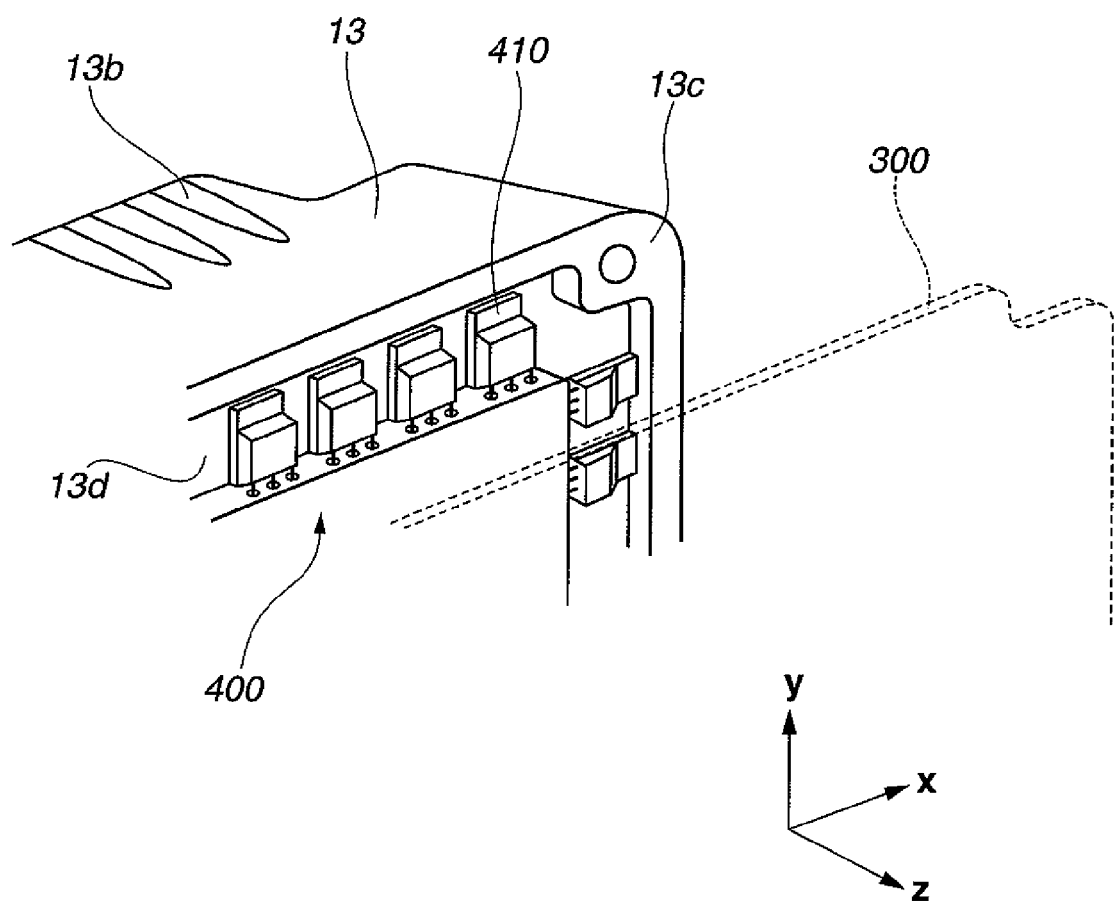
FIG. 6 is a perspective view showing inverters and there vicinity in the power steering system of FIG. 1.

FIG. 6 shows inverters 410 and their vicinity more in detail. Power system board housing 13 includes a first end portion which has heat sink 13b arranged on the outer circumference and which is located on the z-axis negative side, and a second end portion which has an inverter mounting surface 13d on the z-axis positive side and which is formed with an opening for receiving the power system board 400. This inverter mounting surface 13d is substantially flat and parallel to power system board 400. Wall surfaces of inverters 410 are held in contact with the inverter mounting surface 13d. Power system board housing 13 is designed to absorb heat generated by inverters 410 from the inverter mounting surface 13d, and to dissipate the heat from the heat sink 13b.

A steering assist force is produced by motor 100. The driving force of motor 100 is transmitted, through a worm shaft 6 which is provided on the rotation axis of motor 100, to warm wheel 5 and which is connected end to end with the output shaft (120) of motor 100 in alignment. Worm shaft 6 is engaged with worm wheel 5 rotating as a unit with pinion shaft 4. Pinion shaft 4 extends in the y axis negative direction (downward as viewed in FIG. 1) to a portion which is engaged with a rack (not shown). In this way, this steering assist system can drive the rack with a steering assist force by transmitting the driving force of motor 100 to the rack.

FIG. 4 shows an x-z section of first housing 2a. The rotating member of motor 100 includes a large diameter portion serving as the rotor, and a shaft portion serving as the output shaft of motor 100. The output shaft of motor 100 is aligned and coupled with worm shaft 6 (driven member) by a connecting member 9. Worm shaft 6 and rotor 120 are supported, at respective both ends, through bearings 15 and 17 and bearings 16 and 18, on first housing member 2a. Therefore, the positions of worm shaft 6 and rotor 120 are determined only by these bearings. Therefore, it is easier to improve the assembly accuracy simply by improving the accuracy in the positions of bearings 15~18. It is optional to employ a single integral member having an integral portion serving as the worm shaft 6 and an integral portion serving as rotor 120.

In motor control apparatus for an electric power steering system of earlier technology, a control system board for controlling a motor is enclosed in a control board housing for the control system board, and the control board housing is a separate member distinct from a motor housing and a gear housing for a worm gear, so that the size of the entire system is increased. By contrast to this, the control system board 300 according to the first embodiment of the present invention is provided at one axial end of motor 100 (not at a circumference of motor 100). Moreover, in the illustrated example, control system board 300 and rotational position sensor 130 are closely overlapped, and both sides of control system board 30 are used for installing circuit components. Therefore, the first embodiment is advantageous to size reduction, compactness and assembly process.

FIGS. 7~10 show a motor control apparatus according to a second embodiment of the present invention. In the second embodiment, the motor control apparatus includes a motor control section 1, and an actuating section which is combined with the motor control section to form a hydraulic power steering system. In the second embodiment, the motor control section 1 is substantially identical to that of the first embodiment, and the actuating section includes a hydraulic power steering unit 200 in place of the gear housing 11 of the first embodiment. In the second embodiment (unlike the first embodiment), there is provided a housing cover 50 between the motor control section 1 and a pump of in the hydraulic power steering unit 200.

Figure 7:
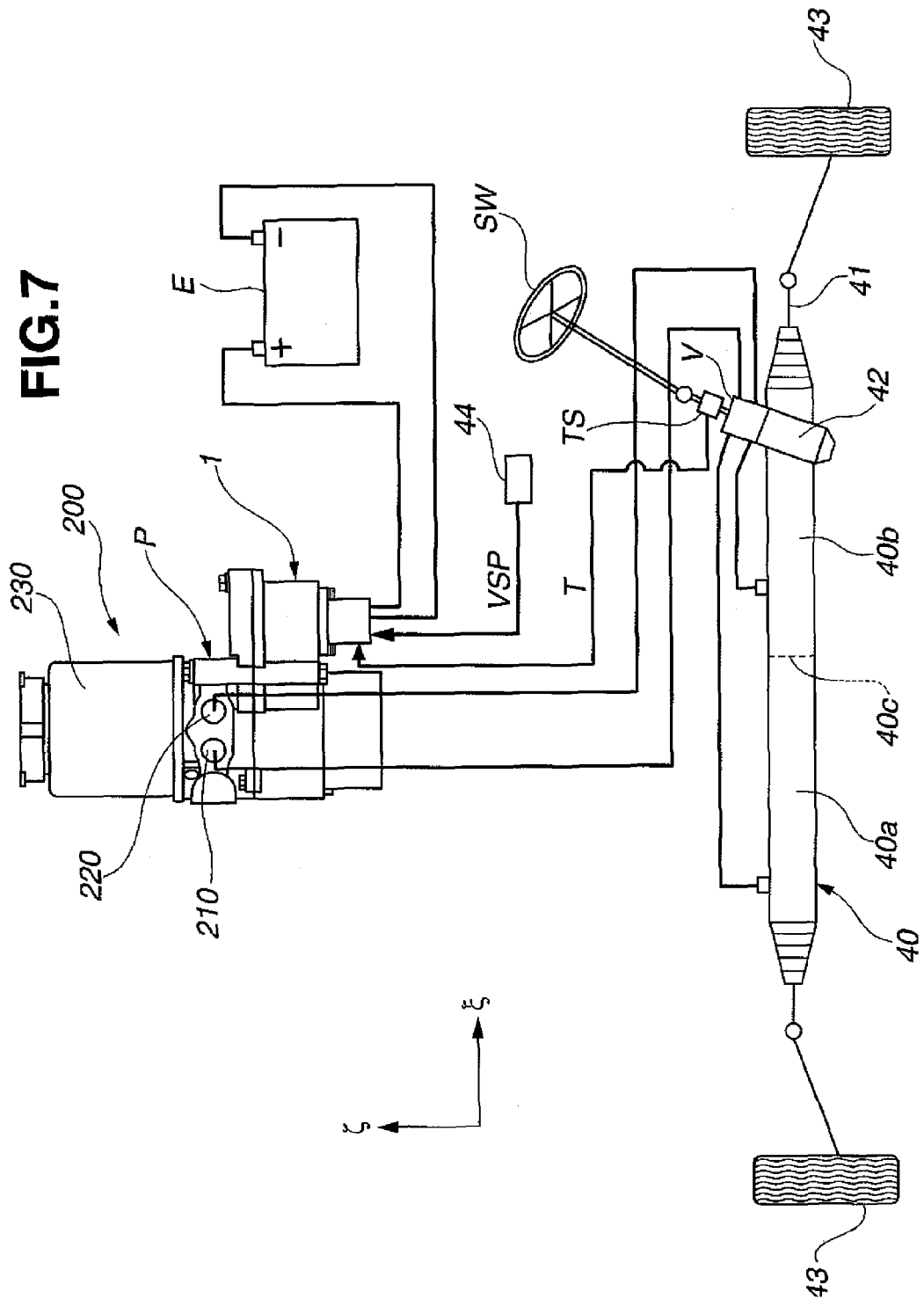
FIG. 7 is a schematic view showing a motor control apparatus in the form of a hydraulic power steering system according to a first practical example of a second embodiment.

FIG. 7 shows a vehicle equipped with the hydraulic power steering system including the motor control section 1, the hydraulic power steering unit 200, a hydraulic cylinder 40, a rack shaft 41, a pinion 42, steerable wheels 43 of the vehicle, a steering wheel SW, a torque sensor TS, a control valve V and a battery E. Hydraulic power steering unit 200 includes a reservoir tank or reservoir 230 and a hydraulic pump P. In this embodiment, a ξ (lateral) axis is an axis extending in the axial direction of the rack shaft 41, a ζ (vertical) axis is a vertical axis, and a η axis is perpendicular to the sheet of FIG. 7.

Pump P of this example is a reversible pump having first and second ports (outlet ports) 210 and 220. Motor control section 1 rotates the pump P in a forward direction or in a reverse direction to produce a steering assist force. Reservoir tank 230 is disposed on the ζ axis positive side of motor control section 1, that is on the upper side of motor control section 1. Reservoir tank 230 is a container for storing a hydraulic fluid supplied to pump P.

The inside of cylinder 40 is divided, by a piston 40c moving as a unit with rack shaft 41, into first and second cylinder chambers 40a and 40b, which are connected, respectively, through control valve V, with first and second outlet ports 210 and 220 of pump P. Rack shaft 41 is engaged with pinion 42 connected with the steering wheel SW.

In accordance with a steering torque T sensed by torque sensor TS provided in the steering linkage between steering wheel SW and pinion 42, the control circuit of the control system board 300 in motor control section 1 drives the pump P with the motor 100. When the hydraulic fluid is supplied by pump P driven by motor 100 in the direction from first cylinder chamber 40a to second cylinder chamber 40b, the rack shaft 41 moves as a unit with piston 40c in the ξ axis negative direction, that is the leftward direction as viewed in FIG. 7, and provides the steering assist force to the wheels 43 in the ξ axis negative direction. The steering assist force in the ξ axis positive direction is produced by supply of the hydraulic fluid from second cylinder chamber 40b to first cylinder chamber 40a.

Figure 8:
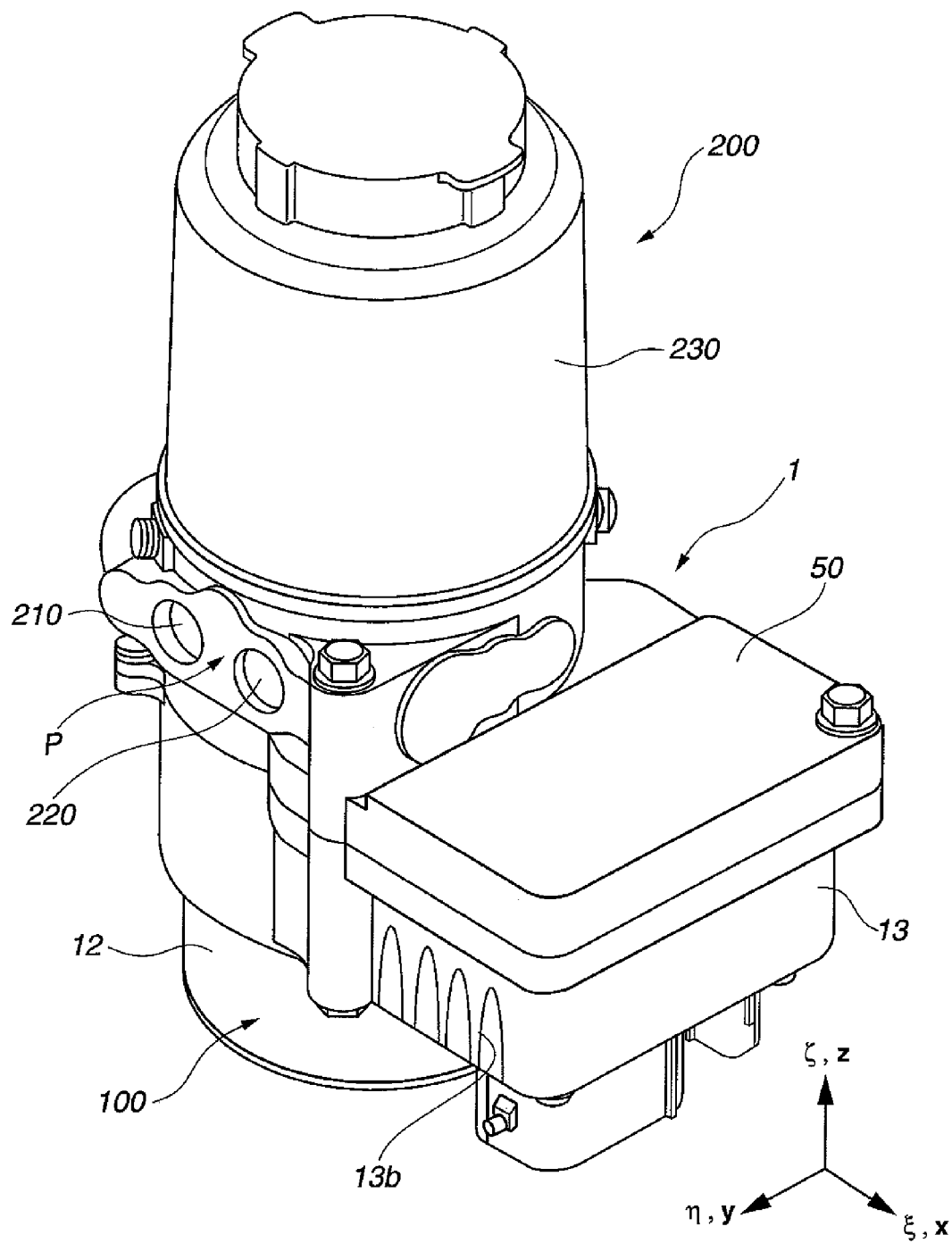
FIG. 8 is a perspective view showing a hydraulic power steering unit of the power steering system of FIG. 7.
Figure 9:
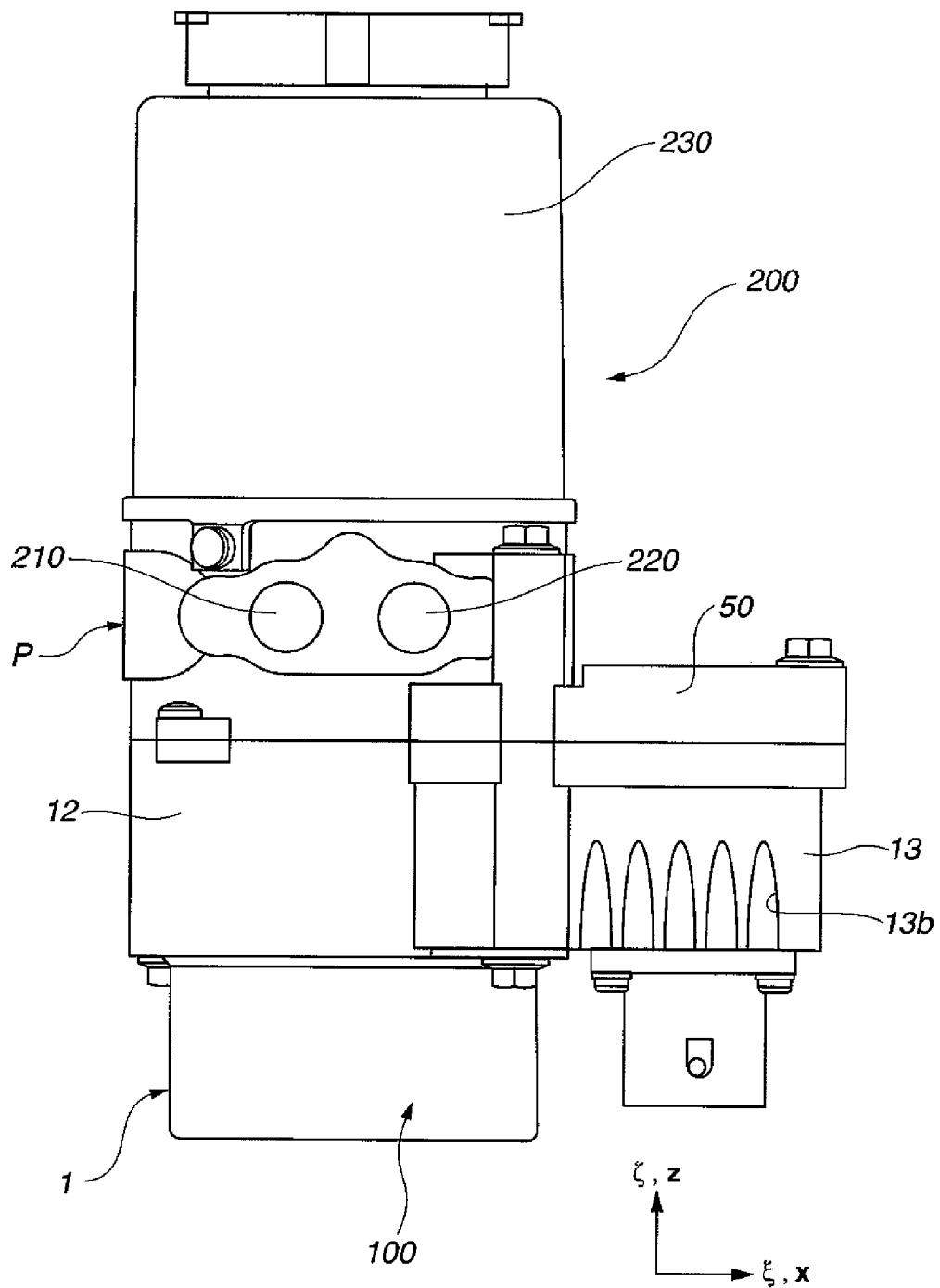
FIG. 9 is a front elevation of the power steering unit of FIG. 8, as viewed in an η axis direction.
Figure 10:
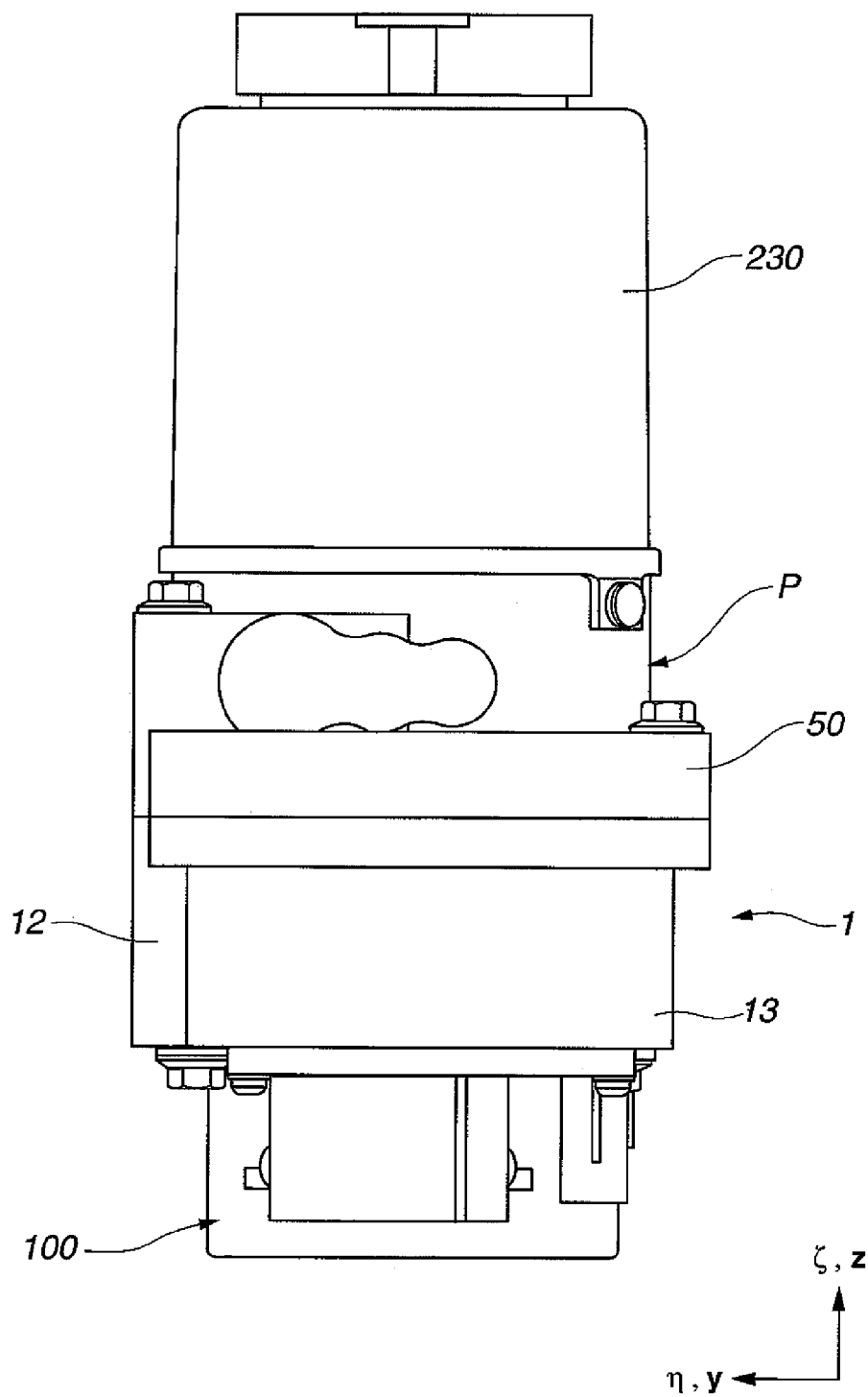
FIG. 10 is a front elevation of the power steering unit of FIG. 8, as viewed in an ξ axis direction.
Figure 11:
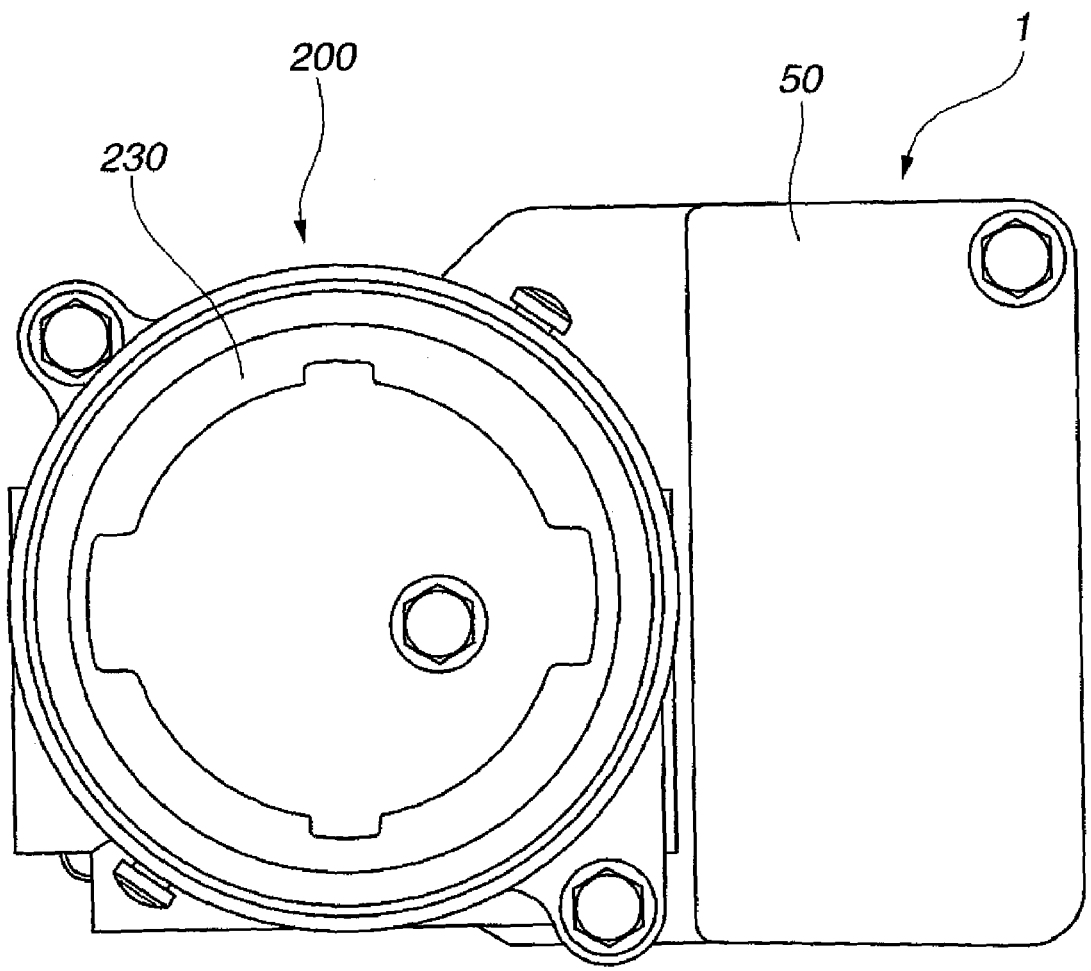
FIG. 11 is a front elevation of the power steering unit of FIG. 8, as viewed in an ζ axis direction.

FIG. 8 is a perspective view of the hydraulic power steering unit 200 which is a single unit including pump P and reservoir tank 230. The hydraulic steering unit 200 according to the second embodiment is further shown in FIG. 9 (front view in the η axis direction), FIG. 10 (front view in the ξ axis direction), FIG. 11 (front view in the ζ axis direction), FIG. 12 (partial sectional view in a ξ-ζ plane), and FIG. 13 (sectional view in a ξ-ζ plane).

Motor control section 1 of the second embodiment is identical in construction to the motor control section 1 employed in the first embodiment. Motor control section 1 is connected with pump P instead of gear housing 11. The z axis extending in the axial direction of motor 100 is directed in the same direction as the ζ (vertical) axis, and the x axis is directed in the same direction as the ξ (lateral) axis. Thus, the ξ-ζ-η coordinate system coincides with the x-y-z coordinate system in the first embodiment.

Figure 12:
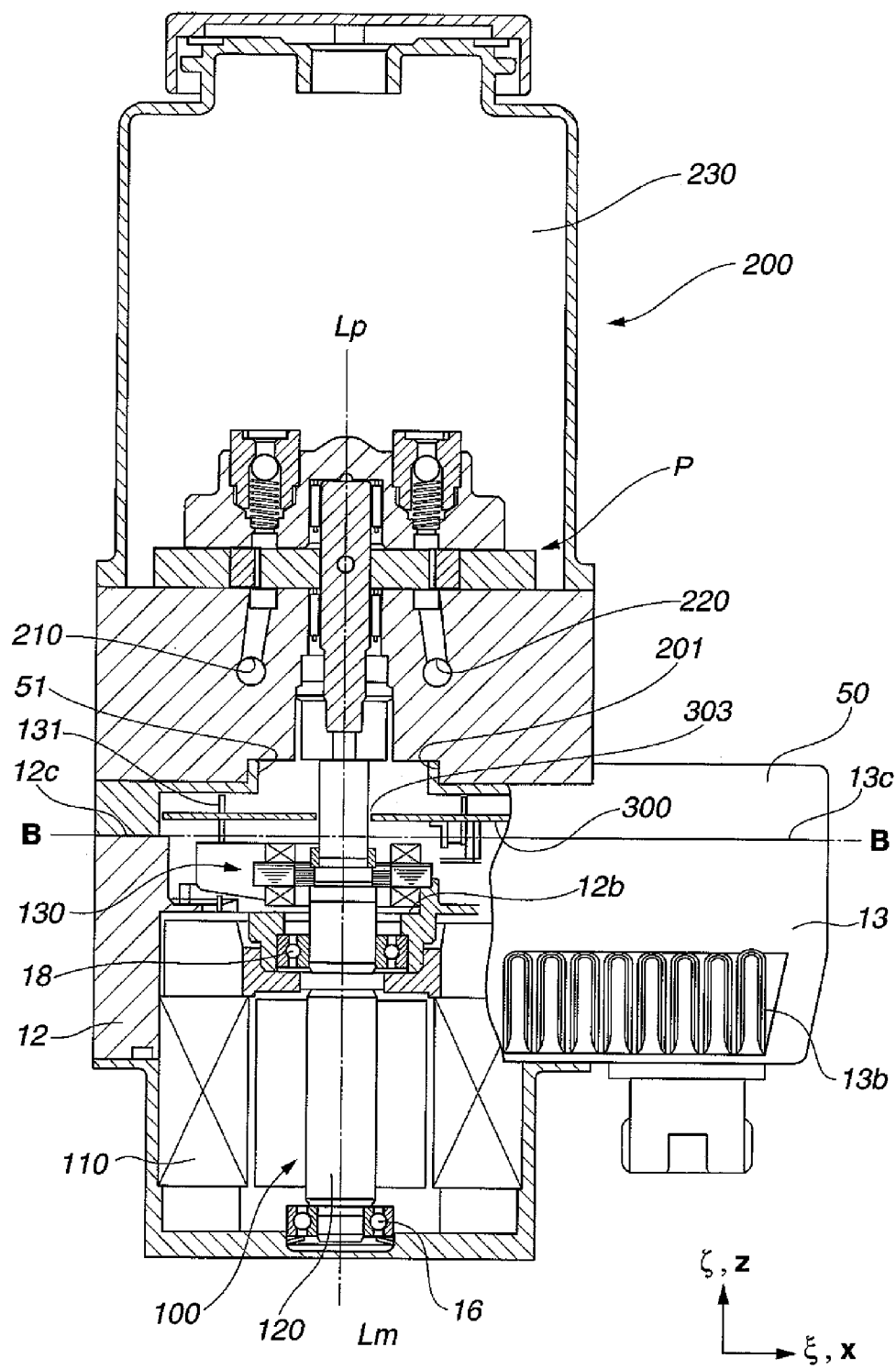
FIG. 12 is a partial sectional view, as if cut by a ξ-ζ plane, of the power steering unit of FIG. 8.
Figure 13:
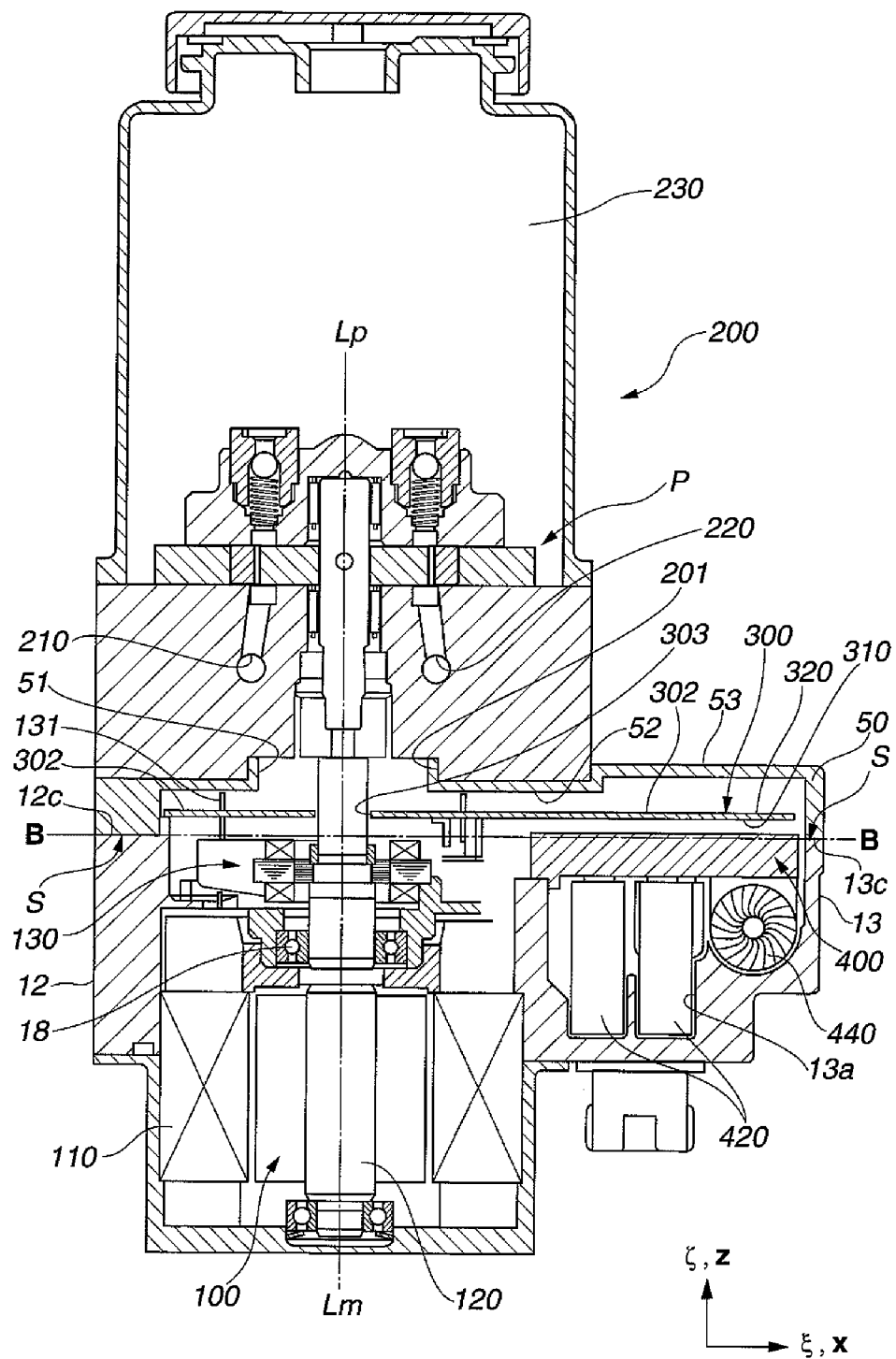
FIG. 13 is a sectional view, as if cut by a ξ-ζ plane, of the power steering unit of FIG. 8.

As in the first embodiment, the control system board 300 in motor control section 1 of the second embodiment is provided on the z axis positive side that is the ζ (vertical) axis positive side (upper side) of motor 100, as best shown in FIGS. 12 and 13 so that the axis of rotor 120 is perpendicular to control system board 300. Motor housing 12 and power system board housing 13 are integral parts of a single housing. A joint surface S between the housing (12, 13) ant pump P is a flat (horizontal) surface B-B.

Motor housing 12 is disposed on the z axis negative side (lower side) of pump P. Power system housing 13 is disposed on the z axis negative side (lower side) of pump P, and on the x axis positive side of motor housing 12. Pump P of this example is a trochoid pump. However, pump P may be of other types.

The rotational position sensor 130 is disposed on the z axis positive side of motor 100, at the position adjacent to control system board 300, between motor housing 12 and control system board 300. Power system board housing 13 is an aluminum die casting integral with the motor housing 12. Power system board housing 13 has the heat sink 13b on the z axis negative outer side (lower side), and the power system device receiving portions 13a for receiving and positioning the power system devices 420, 430 and 440 independently at respective positions.

Control system board 300 is disposed, between power system board 400 and pump P, at the end of motor 100 on the z axis positive side, and so oriented that the axis of rotor 120 intersects the control system board 300 substantially at right angles. The output terminals 131 of rotational position sensor 130 extend in the z axis positive direction, that is the upward direction, fittingly into respective holes in control system board 300 substantially at right angles. The motor side circuit 310 and outer side circuit 320 are formed on both sides of control system board 300, as in the first embodiment.

Control system board 300 includes the first board portion 301 formed with the through hole 303, and the second board portion 302 projecting radially outwards from the first board portion 301. The output shaft of motor 100 extends upwards through the through hole 303 of control system board 300. The opening size or the diameter of through hole 303 is made small to increase the area for installation of components of the control circuit on control system board 300. The diameter of the through hole 303 is smaller than the outside diameter of rotational position sensor 130. In this example, the diameter of the through hole 303 is smaller than the inside diameter of a stationary annular portion of the rotational position sensor 130.

Reservoir tank 230 is disposed on the z axis positive side, that is, the vertical upper side of the through hole 303, and motor 100 is disposed on the z axis negative side, that is the vertical lower side, of the through hole 303. A leakage of the hydraulic fluid from reservoir tank 230 can flow down on the output shaft 120 inserted upward through the through hole 303, and flows through an annular clearance between the output shaft 120 and the through hole 303, to the lower side of control system board 300 toward motor 100. This arrangement helps protect the control system board 300 from being wetted by the hydraulic fluid flowing by leakage from the reservoir tank 230.

Power system board 400 is placed horizontally, closely under the second board portion 302 of control system board 300. In the dead space on the x axis positive side of motor housing 12, the relay 420, capacitor 430 and nose reducing coil 440 having relatively large volumes are supported on power system board 400.

Power system board 400 is located on the x axis positive side of motor 100, at such a circumferential position around motor 100 that the power system board 400 overlaps the second board portion 302 of control system board 300. The power supply connector 20 and signal connector 30 are passed through the through portions 403 and 404 of power system board 400, respectively. A vehicle speed signal VSP of a vehicle speed sensor 44 is supplied to the circuit of control system board 300 through signal connector 30. In the second embodiment, too, one or more inverters 410 are mounted on power system board 400, and arranged in the same manner as in the first embodiment, as shown in FIG. 6.

The housing cover 50 is provided between the pump P and the integral housing composed of motor housing 12 and power system board housing 13, as best shown in FIG. 13, and arranged to close the opening defined by the z axis positive side ends 12c and 13c of the integral housing (12, 13).

Housing cover 50 includes a fitting portion 51, and a casing member of pump P includes a fitting portion 201. The fitting portions 51 and 201 are engaged with each other to align the rotation axis Lp of pump P with the rotation axis Lm of motor 100. In this example, the fitting portion 201 is depressed upward, and the fitting portion 51 is projected upward and fit in the fitting portion 201, as shown in FIG. 13. The rotating shaft of pump P and the output shaft of motor 100 are thus aligned and connected drivingly end to end with each other through the holes of the fitting portions 51 and 201.

Housing cover 50 includes a first (pump side) cover portion 52 located between the pump P and motor 100, and a second (outer) cover portion 53 extending radially outwards from the first cover portion 52 beyond the circumference of pump P. The height of second cover portion 53 in the z axis direction or vertical direction is greater than the height of first cover portion 52, as shown in FIG. 13. Therefore, second cover portion 53 can cover taller components mounted on the upper side of control system board 300. The axial or vertical dimension of the whole system can be reduced by mounting shorter components on the first board portion 301 of control system board 300 under the first cover portion 51, and mounting taller components on the second board portion 302 of control system board 300 under the second cover portion 52.

In the second embodiment, the reversible pump P having two outlet ports 210 and 220 is driven in the forward and reverse direction by the motor control section 1. By using the motor control section 1 arranged compactly as in the first embodiment, the power steering system is made compact and simple.

Figure 14:
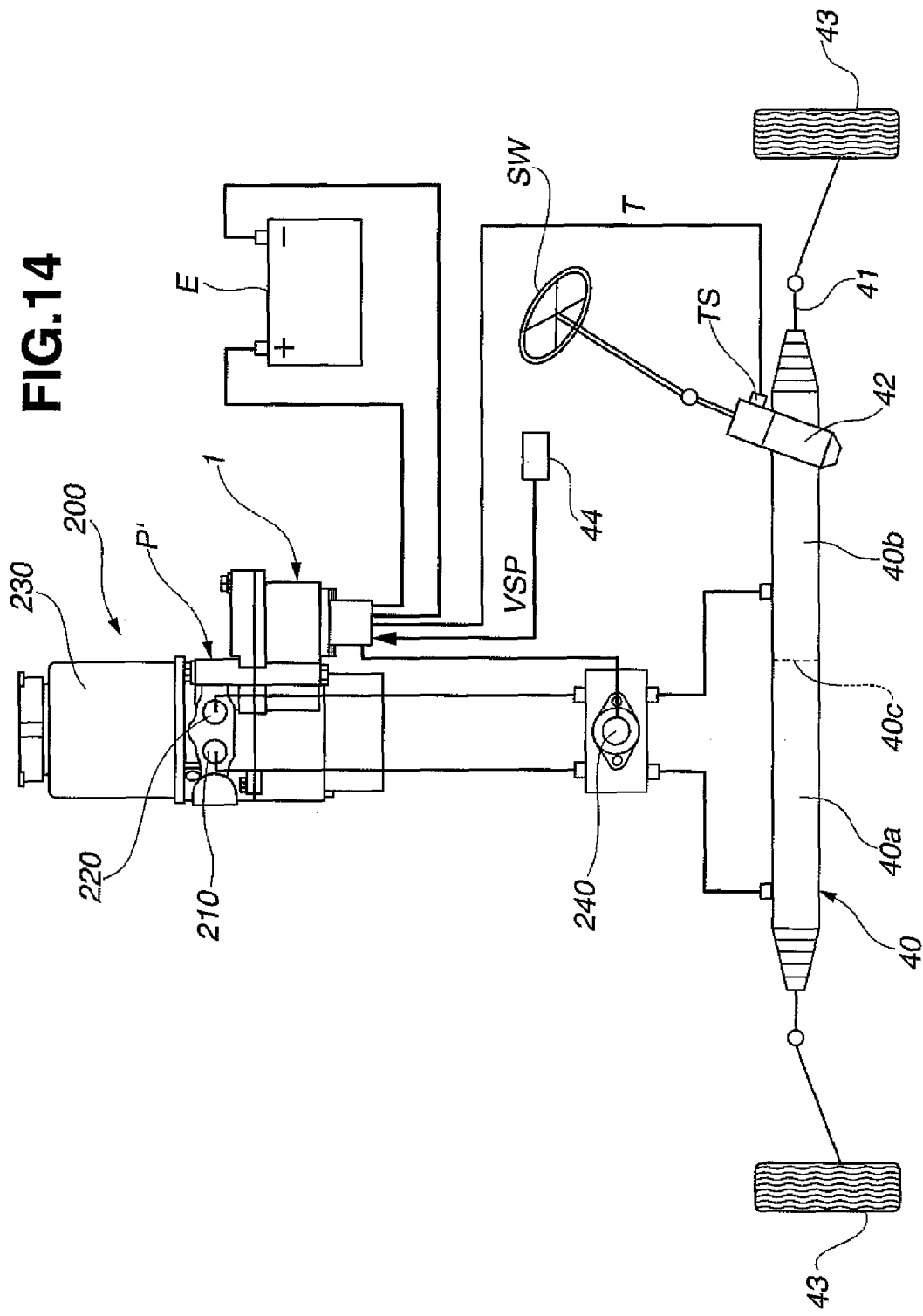
FIG. 14 is a schematic view showing a motor control apparatus in the form of a hydraulic power steering system according to a second practical example of the second embodiment.

FIG. 14 shows a variation (or a second practical example) of the second embodiment. The hydraulic power steering system shown in FIG. 14 is different from the power steering system of FIG. 7 in the following points. A one-direction pump P' is employed in place of reversible pump P. A control valve 240 is provided between pump P' and the hydraulic cylinder 40, and arranged to change over the suck/discharge of the hydraulic fluid to produce the steering assist force in the desired directions. The power steering system of FIG. 14 can provide advantageous effects as in the system of FIG. 7.

Figure 15:
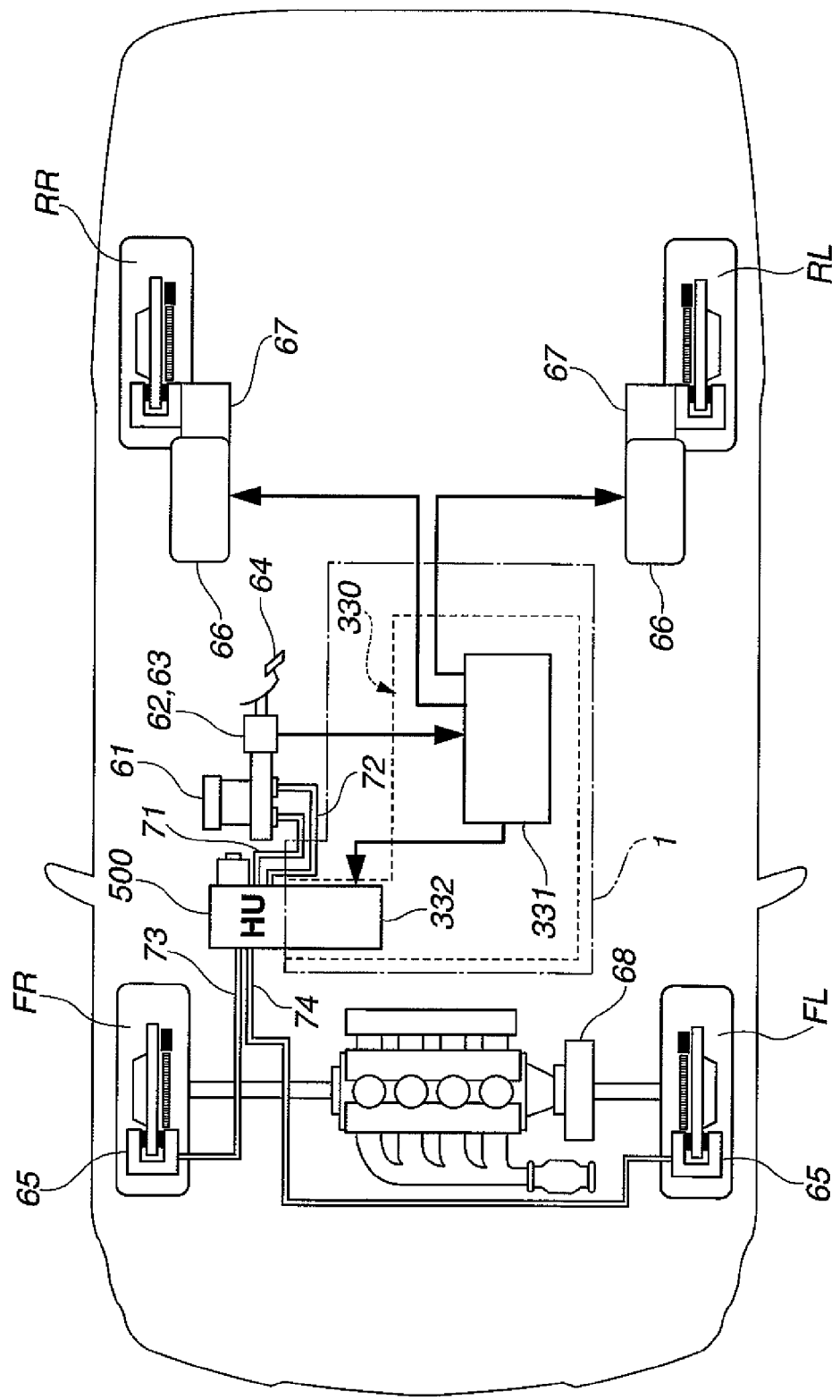
FIG. 15 is a schematic view showing a motor control apparatus in the form of a brake control system according to a first practical example of a third embodiment.
Figure 16:
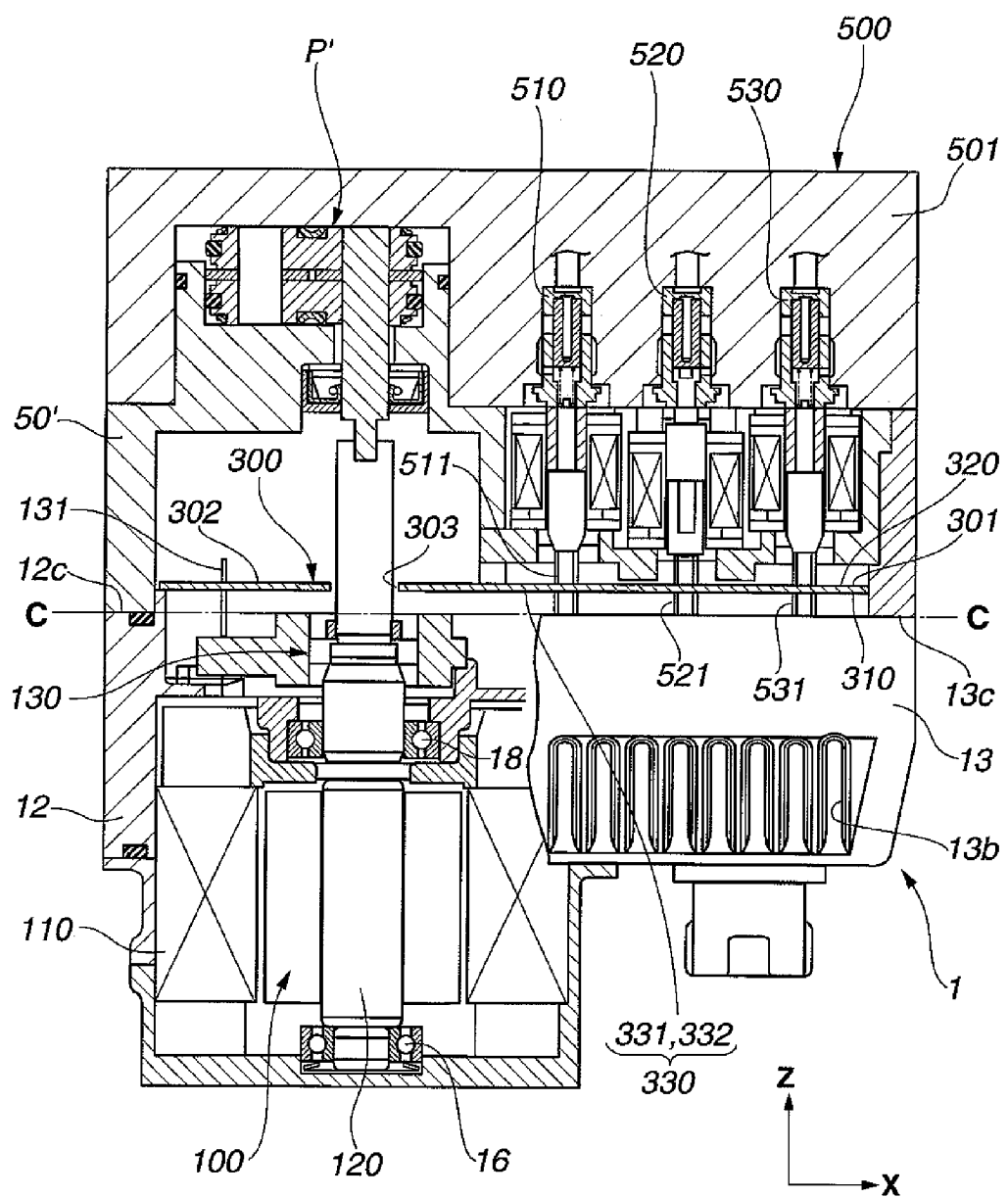
FIG. 16 is a partial sectional view, as if cut by a x-z plane, of a brake control unit of the brake control system of FIG. 15.
Figure 17:
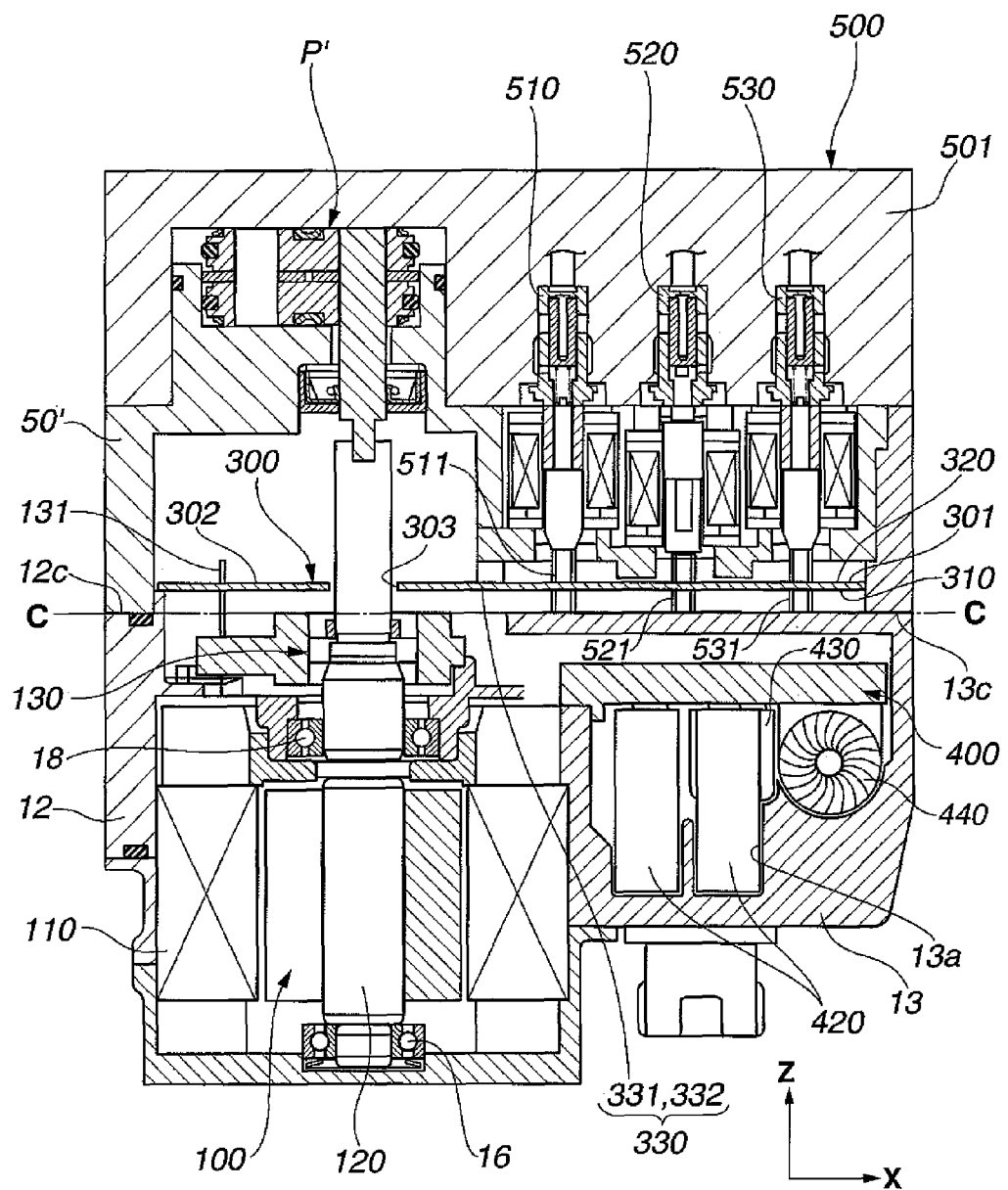
FIG. 17 is a sectional view of the brake control unit of the brake control system of FIG. 15.

FIGS. 15~17 show a motor control apparatus in a first practical example according to a third embodiment of the present invention. In the third embodiment, the motor control apparatus includes a motor control section 1, and an actuating section which is combined with the motor control section to form a hydraulic brake control system. In the third embodiment, the motor control section 1 is substantially identical to that of the first embodiment, and the actuating section includes a brake control unit 500.

FIG. 15 shows a vehicle equipped with the brake control system according to the third embodiment. The brake control system shown in FIG. 15 is a brake-by-wire system. In this example, the brake system include hydraulic brake actuators 65 for front wheels FR and FL, and electric brake actuators 67 for braking rear wheels RR and RL electrically without using the hydraulic pressure. However, the present invention is not limited to this brake system. For example, it is optional to employ hydraulic brake actuators for all the four wheels.

The brake control unit 500 includes a pump P' for supplying the hydraulic pressure to hydraulic brake actuators 65 for braking the front wheels, and solenoid valves 510, 520 and 530 for controlling the hydraulic pressure supplied from pump P'. This brake control unit 500 is connected with the motor control section 1 identical to the motor control section according to the first and second embodiments.

In the third embodiment, a microcomputer 330 is mounted on the control system board 300 (as shown in FIGS. 16 and 17). Microcomputer 330 is configured to control inverters 410 in accordance with a brake pedal condition or a wheel slip condition. In this example, microcomputer 330 serves as a main ECU 331 for fluid pressure calculation and solenoid valve control, and a brake ECU 332. However, it is optional to employ two or more microcomputers for main ECU 331 and brake ECU 332. Inverters 410 are mounted in the same manner as in the first embodiment (as shown in FIG. 6).

A master cylinder 61 is provided with a stroke sensor 62 and a stroke simulator 63. When a brake pedal 64 is depressed by a driver, the master cylinder 61 produces a fluid pressure, and the stroke sensor 62 sends a stroke signal representing the stroke or depression degree of brake pedal 64, to main ECU 331. The master cylinder pressure produced by master cylinder 61 is supplied through oil passages 71 and 72, to brake control unit 500, and the fluid pressure controlled by brake control unit 500 is supplied through oil passages 73 and 74, to the front wheel cylinders (or actuators) 65.

Main ECU 331 calculates a desired front wheel fluid pressure in accordance with the stroke signal, taking account of a vehicle operating condition or vehicle motion variable such as a vehicle speed and a vehicle yaw rate; controls the fluid pressures of the wheel cylinders 65 by sending a command signal through brake ECU 332, to brake control unit 500; and acts to brake the front wheels with a regenerative brake unit 68 on braking. The rear wheel brake actuators 66 control the braking forces of respective electric calipers 67 in response to command signals from main ECU 331.

Brake control unit 500 includes pump P' and solenoid valves 510~530. In the case of a normal brake operation of the brake-by-wire system, brake control unit 500 shuts off the connection between master cylinder 61 and wheel cylinders 65, and supplies the fluid pressures to wheel cylinders 65 with pump P' (shown in FIGS. 16 and 17) to produce the braking force. If a wheel locking tendency is increased by an abrupt braking operation of the driver, the brake control unit 500 drives solenoid valves 510~530 to decrease the wheel locking tendency, and shuts off the supply of the fluid pressure from master cylinder 61 to the front wheel cylinders 65.

Thus, brake control unit 500 drives the solenoid valves 510~530 in the unit appropriately and thereby decreases the brake fluid pressures in front wheel cylinders 65 to produce the braking force while preventing wheel locking. When the brake-by-wire system is unable to function properly, the brake control unit 500 produces the braking force by allowing the supply of the master cylinder pressure to wheel cylinders 65.

The motor control section 1 and the brake control unit 500 are united into a single unit as shown in a x-z plane partial sectional view of FIG. 16, and an entire sectional view of FIG. 17. Motor control section 1 is identical to that of the first and second embodiments.

Motor control section 1 is joined with brake control unit 500 in place of gear housing 11 of the first embodiment, in a flat joint plane C-C. Brake control unit 500 includes hydraulic pump P', and is joined, through a housing cover 50', with the housing composed of the motor housing 12 and power system board housing 13.

Pump P' of this example is of an external gear type, and is driven by the motor 100. However, it is optional to employ a pump of any other type. The solenoid valves 510~530 for regulating the brake fluid pressure are provided on the x axis positive side of pump P' (on the right side of pump p' in FIGS. 16 and 17).

Solenoid valves 510~530 includes connection terminals 511~531, and these solenoid valves 510~530 are mounted so that the terminals 511~531 confront the control system board 300 of motor control section 1. Terminals 511~531 projects to control system board 300 in the z axis negative direction, and are connected with the control circuit on control system board 300. Brake control ECU 332 of microcomputer 330 mounted on control system board 300 is configured to control the brake fluid pressure by controlling the open/close states of the solenoid valves 310~330 in accordance with a command signal from main ECU 331.

In the third embodiment, too, housing cover 50' is placed between pump P' and the housing composed of motor housing 12 and power system board housing 13, and arranged to close the opening defined by the z axis positive side ends 12c and 13c of the housings 12 and 13. Housing cover 50' includes a fitting portion which is fit in a recessed portion of a housing 501 of brake control unit 500, and which is shaped to fittingly receive pump P'. Therefore, the fitting portion of housing cover 50' makes it easy to determine the positions of pump P' and motor 100, and to align the motor rotation axis Lm of motor 100 and the pump rotation axis Lp of pump P'.

By the combination of motor control section 1 and brake control unit 500 including pump P' and solenoid valves 510~530, the third embodiment can provide the same advantageous effects as in the first and second embodiments.

Figure 18:
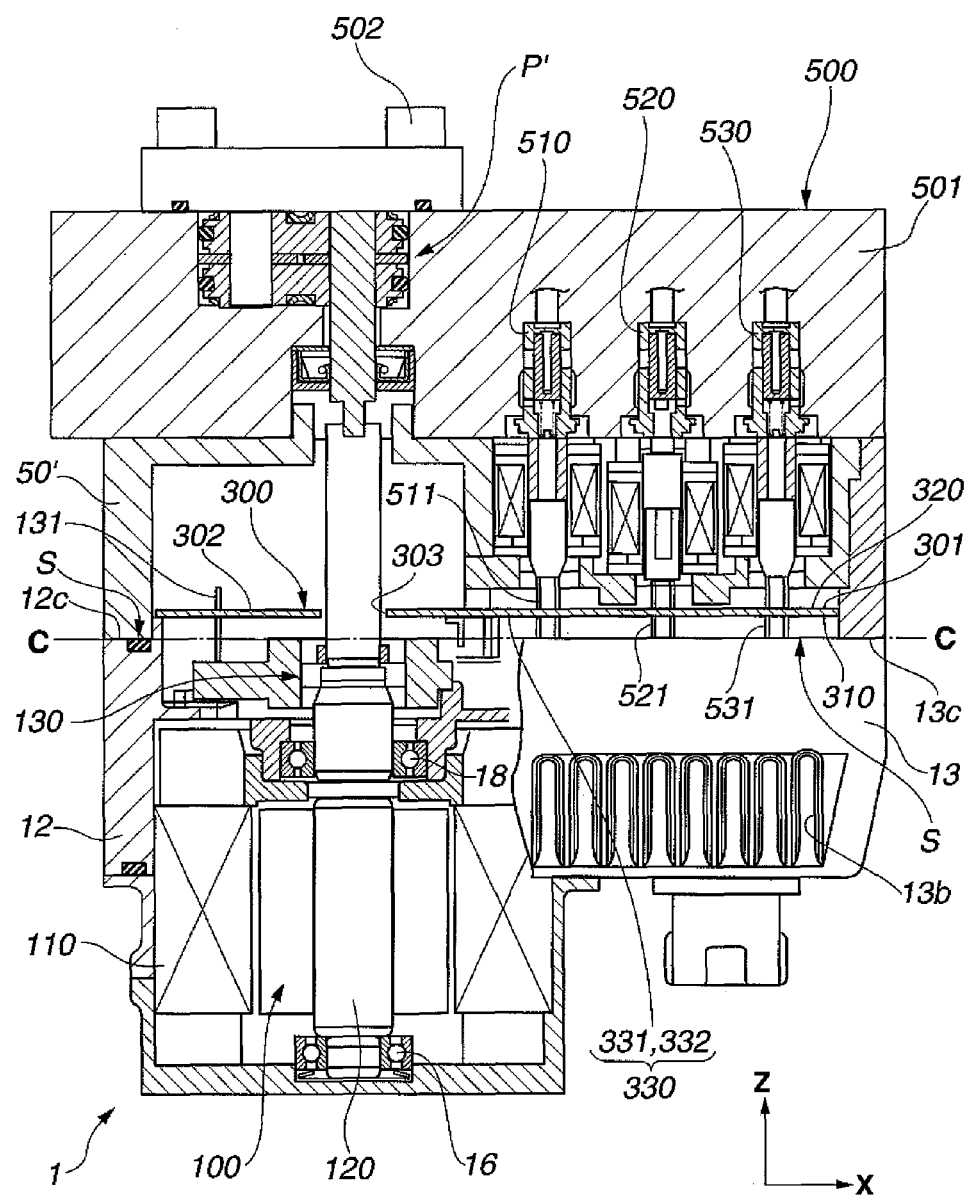
FIG. 18 is a sectional view of a brake control unit housing of a brake control system according to a second practical example of the third embodiment.

FIG. 18 shows a second practical example according to the third embodiment. In the second practical example, pump P' is received in a recess formed in the brake control unit housing 501, and covered with a cover 502 located on the z axis positive side of the housing 501.

Figure 19:
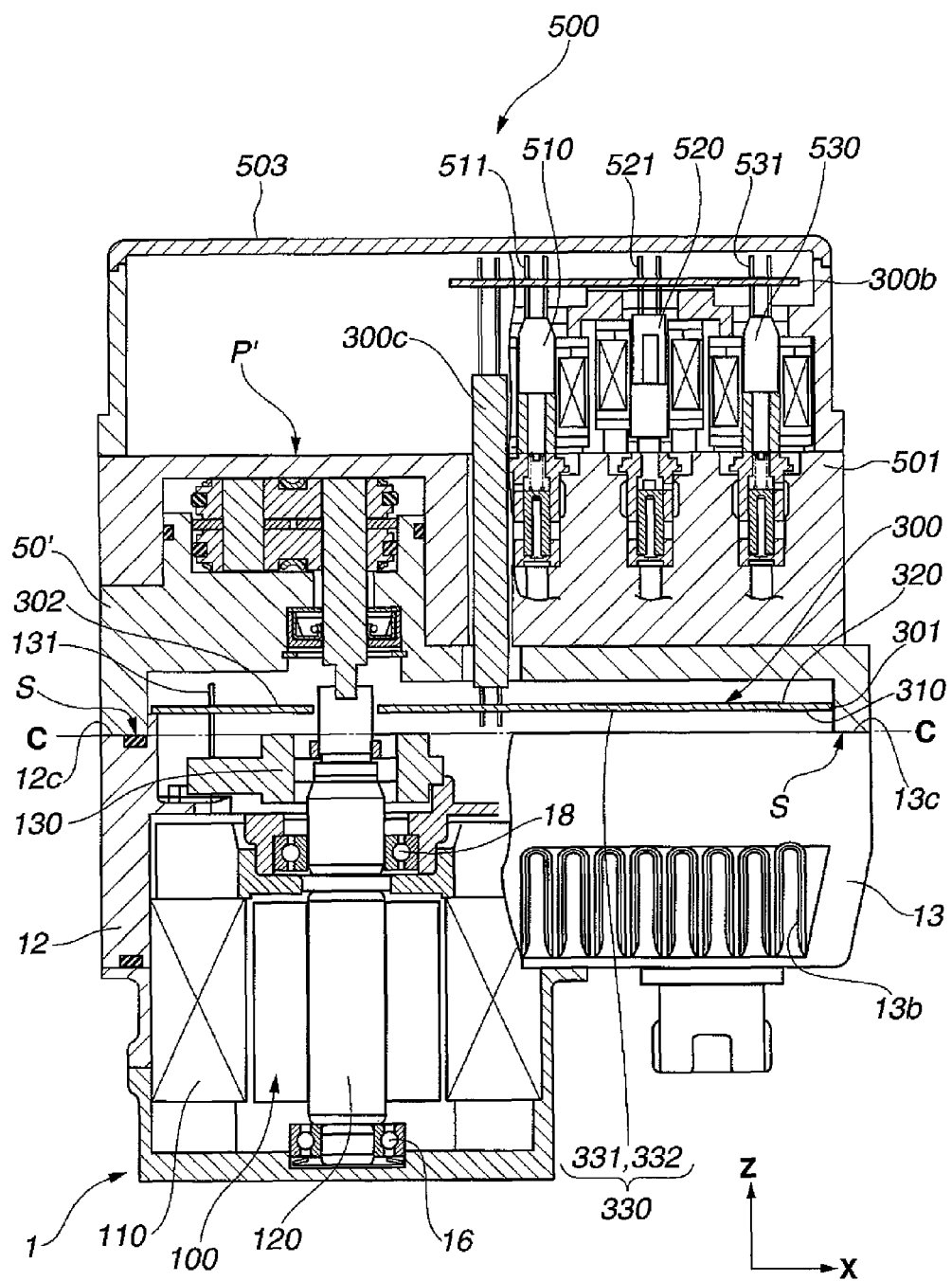
FIG. 19 is a sectional view of a brake control unit housing of a brake control system according to a third practical example of the third embodiment.

FIG. 19 shows a third practical example according to the third embodiment. In the third practical example, there is provided a second control system board 300b in addition to the first control system board 300 (or 300a). The first control system board 300 is substantially identical to that of the first practical example shown in FIGS. 16 and 17. In this example, the first and second control system boards 300 and 300b are substantially parallel to each other, and both boards 300 and 300b are connected by a connecting member 300c extending along the z axis. The first control system board 300 on the z axis negative side is enclosed by motor housing 12, power system board housing 13 and housing cover 50'. Second control system board 300b on the z axis positive side is enclosed by brake system unit housing 501 and cover 503. Solenoid valves 510~533 are placed between the first and second control system boards 300 and 300b. The connection terminals 511, 521 and 531 of first, second and third solenoid valves 510, 520 and 530 projects in the z axis positive direction toward second control system board 300b, and these terminals 511, 521 and 531 are connected with second control system board 300b. In the first practical example shown in FIGS. 16 and 17, the connection terminals 511, 521 and 531 of first, second and third solenoid valves 510, 520 and 530 projects in the z axis negative direction toward the control system board 300, and these terminals 511, 521 and 531 are connected with the control system board 300.

Figure 20:
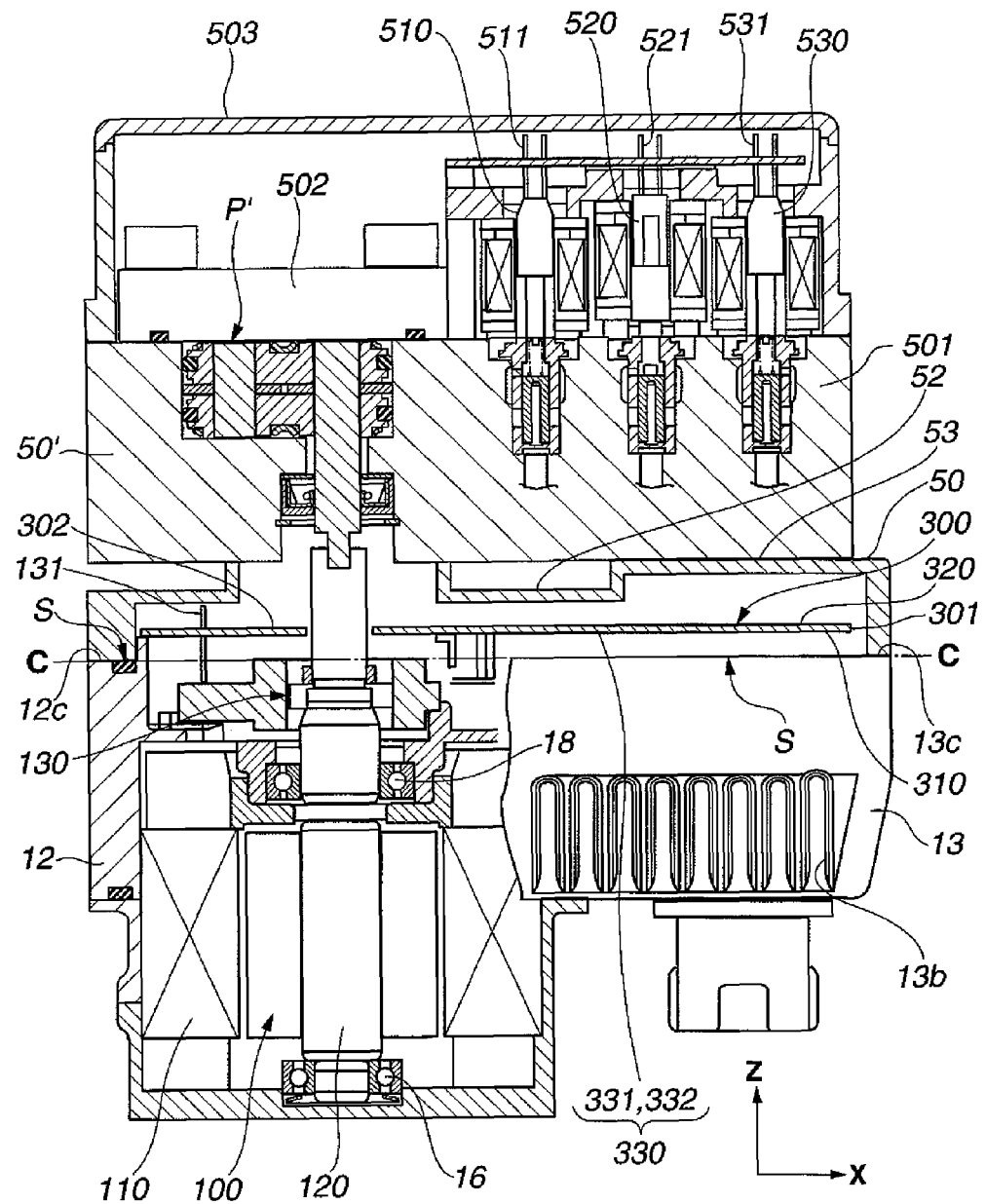
FIG. 20 is a sectional view of a brake control unit housing of a brake control system according to a fourth practical example of the third embodiment.

FIG. 20 shows a fourth practical example according to the third embodiment. The fourth practical example employs the first and second control system boards 300 and 300b as in the third practical example, and further employs a pump cover 502. Pump cover 502 is enclosed in cover 503, and fixed to the unit housing 501 so that pump P' is enclosed liquid-tightly. In the fourth practical example of FIG. 20, there is provided, between cover 50' and the housing composed of motor housing 12 and power system board housing 13, a cover 50 similar to the cover 50 shown in FIG. 13.

Figure 21:
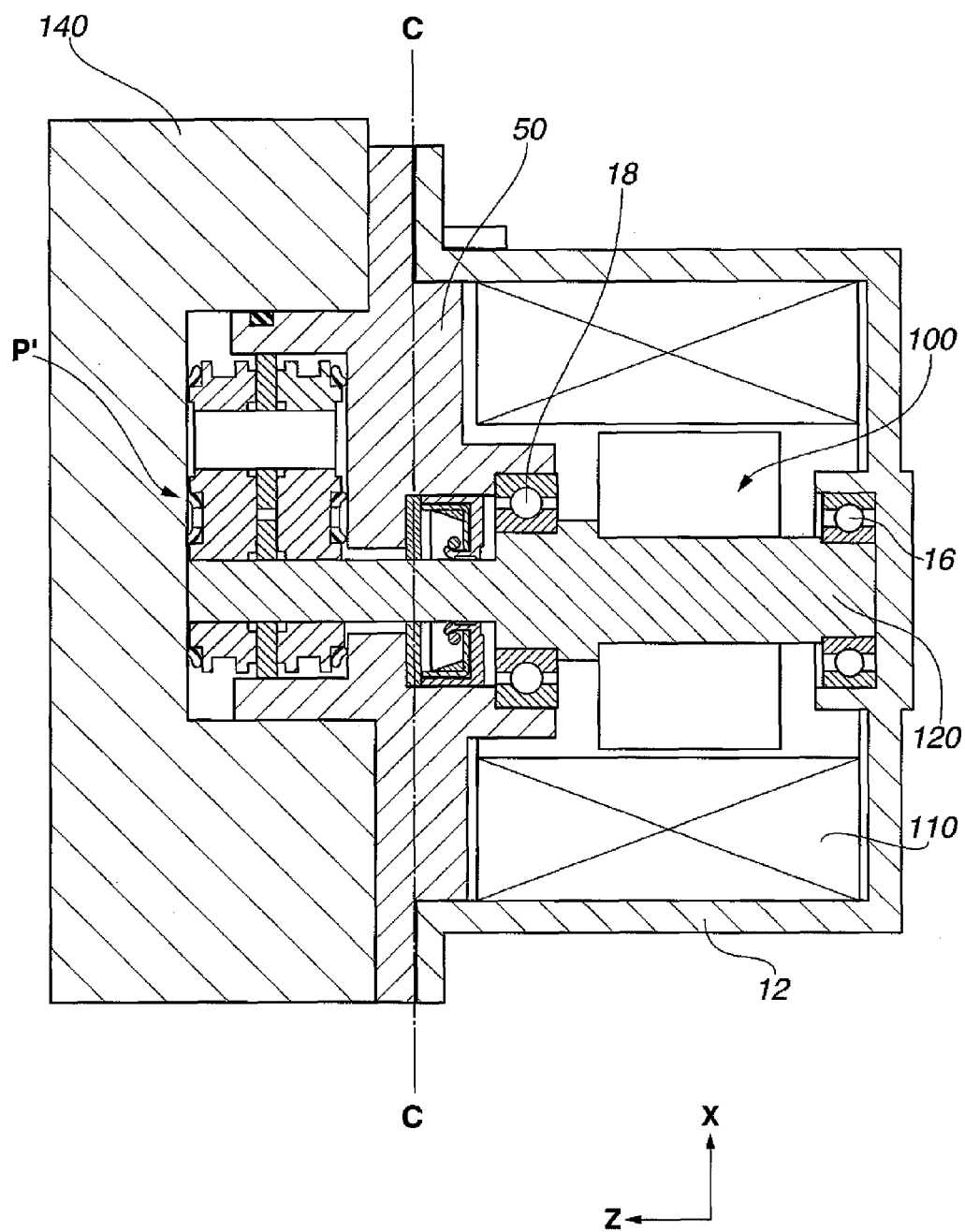
FIG. 21 is a sectional view of a brake control unit housing of a brake control system according to a fifth practical example of the third embodiment.

FIG. 21 shows a fifth practical example according to the third embodiment. The fifth practical example employs a motor front cover 140 which serves both as a pump cover and a motor cover for motor 100. These second through fifth practical examples can provide the same effects as in the first practical example of the third embodiment. In the third embodiment, the solenoid valves can be mounted on the control system board.

This application is based on a prior Japanese Patent Application No. 2004-336806 filed on Nov. 22, 2004, and a prior Japanese Patent Application No. 2005-260111 filed on Sep. 8, 2005. The entire contents of Japanese Patent Application No. 2004-336806 and Japanese Patent Application No. 2005-260111 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An electric power steering apparatus comprising:
    a housing having an inside receiving space;
    a steering gear mechanism which is received in the housing and which includes a worm wheel connected with a steering shaft, and a worm shaft engaged with the worm wheel;
    a motor which is received in the housing, which includes a rotating member serving as a motor output shaft and being connected with the worm shaft, and which is arranged to provide a steering assist force through the worm shaft and the worm wheel, to the steering shaft for transmitting rotation from a steering wheel toward a steerable wheel;
    a power system board which is received in the housing, which supports a component of a power supply circuit to supply power to the motor;
    a control system board which is received in the housing, which supports a component of a control circuit to control the motor, and which extends radially with respect to an axis of the motor output shaft;

a rotation sensor which is provided in the housing, which is located, in an axial direction of the motor output shaft, between the motor and the control system board, and which is arranged to sense a rotational position of the motor output shaft;

an output terminal which is provided with the rotation sensor, which is connected electrically with the control system board to supply a rotational position signal of the rotation sensor to the control circuit; and wherein the control system board includes a through-hole through which the motor output shaft of the motor extends.

2. An electric power steering apparatus comprising:

a housing having an inside receiving space;

a steering gear mechanism which is received in the housing and which includes a worm wheel connected with a steering shaft, and a worm shaft engaged with the worm wheel;

a motor which is received in the housing, which includes a rotating member serving as a motor output shaft and being connected with the worm shaft, and which is arranged to provide a steering assist force through the worm shaft and the worm wheel, to the steering shaft for transmitting rotation from a steering wheel toward a steerable wheel;

a power system board which is received in the housing, which supports a component of a power supply circuit to supply power to the motor;

a control system board which is received in the housing, which supports a component of a control circuit to control the motor, and which extends radially with respect to an axis of the motor output shaft;

a rotation sensor which is provided in the housing, which is located, in an axial direction of the motor output shaft, between the motor and the control system board, and which is arranged to sense a rotational position of the motor output shaft;

an output terminal which is provided with the rotation sensor, which is connected electrically with the control system board to supply a rotational position signal of the rotation sensor to the control circuit; and wherein the output terminal of the rotation sensor includes a pin projecting in the axial direction of the motor output shaft, which is substantially perpendicular to the control system board and being inserted into the control system board.

3. An electric power steering apparatus comprising:

a housing having therein an inside space;

a steering gear mechanism which is received in the housing and which includes a worm wheel connected with a steering shaft and a worm shaft engaged with the worm wheel;

a motor which is received in the housing, which includes a rotating member serving as a motor output shaft and being connected with the worm shaft and which is arranged to provide a steering assist force to the steering shaft through the worm shaft and the worm wheel;

a power system board which is received in the housing, and which supports a component of a power supply circuit to supply power to the motor;

a control system board which is received in the housing, which is located between the motor and the steering gear mechanism, which is disposed so as to extend radially with respect to an axis of the motor output shaft, and which supports a component of a control circuit to control the power supply circuit;

a rotation sensor which is located between the motor and the control system board, and which is arranged to sense a rotational position of the motor output shaft; and a radially extending portion which is formed in the housing, which includes a sensor mounting portion supporting the rotation sensor, and which extends radially outwards from the sensor mounting portion.

4. The electric power steering apparatus as claimed in claim 3, wherein the electric power steering apparatus further includes a bearing provided in the housing, and arranged to support the motor output shaft at a position between the motor and the steering gear mechanism, and the bearing is supported, through the radially extending portion, by the housing.

5. The electric power steering apparatus as claimed in claim 3, wherein the housing includes a circumferential wall surrounding the motor and the radially extending portion which is an annular end wall extending radially inwards from the circumferential wall.

6. The electric power steering apparatus as claimed in claim 5, wherein the housing includes a bearing support portion supporting the bearing, the bearing support portion being connected with the circumferential wall through the radially extending portion.

* * * * *